United States Patent
Bele et al.

(10) Patent No.: US 9,147,885 B2
(45) Date of Patent: Sep. 29, 2015

(54) ELECTROCATALYTIC COMPOSITE(S), ASSOCIATED COMPOSITION(S), AND ASSOCIATED PROCESS(ES)

(75) Inventors: Marjan Bele, Ljubljana (SI); Miran Gaberšček, Domžale (SI); Gregor Kapun, Veliki Gaber (SI); Nejc Hodnik, Ljubljana (SI); Stanko Hočevar, Ljubljana (SI)

(73) Assignee: KEMIJSKI INSTITUT, Ljublana (SI)

( * ) Notice: Subject to any disclaimer, the term of this patent is extended or adjusted under 35 U.S.C. 154(b) by 157 days.

(21) Appl. No.: 13/554,551

(22) Filed: Jul. 20, 2012

(65) Prior Publication Data

US 2013/0045866 A1 Feb. 21, 2013

Related U.S. Application Data

(60) Provisional application No. 61/510,452, filed on Jul. 21, 2011.

(51) Int. Cl.
*B22F 1/00* (2006.01)
*C22C 1/05* (2006.01)
*B22F 9/30* (2006.01)
(Continued)

(52) U.S. Cl.
CPC ............. *H01M 4/921* (2013.01); *B22F 1/0018* (2013.01); *B22F 1/025* (2013.01); *B22F 9/22* (2013.01); *B22F 9/30* (2013.01); *B82Y 30/00* (2013.01); *C22C 1/05* (2013.01); *C22C 5/04* (2013.01); *C22C 9/00* (2013.01); *C22C 9/06* (2013.01); *C22C 19/03* (2013.01); *H01M 4/926* (2013.01); *B22F 2999/00* (2013.01); *Y02E 60/50* (2013.01); *Y02E 60/523* (2013.01)

(58) Field of Classification Search
None
See application file for complete search history.

(56) References Cited

U.S. PATENT DOCUMENTS

| | | | | |
|---|---|---|---|---|
| 7,220,398 | B2 * | 5/2007 | Sutorik et al. | 423/593.1 |
| 7,276,224 | B2 * | 10/2007 | Zachariah et al. | 423/592.1 |
| 2012/0208313 | A1 * | 8/2012 | Cao et al. | 438/71 |

OTHER PUBLICATIONS

Casado-Rivera et al.; Electrocatalytic Activity of Ordered Intermetallic Phases for Fuel Cell Appliations; J. Am. Chem. Soc. 2004, 126, 4043-4049.

(Continued)

*Primary Examiner* — George Wyszomierski
(74) *Attorney, Agent, or Firm* — MacCord Mason PLLC

(57) ABSTRACT

Compositions having electrocatalytic activity and composites having electrocatalytic activity, as well as processes for making compositions and composites are described. Also, processes for using such compositions and/or composites, such as, for example, a machine or equipment are described. Some aspects of embodiments and/or embodiments of the present invention are directed to a nanosize transition metal alloy (such as for example an alloy and/or one or more intermetallics comprising copper, cobalt, nickel, palladium, platinum, ruthenium, the like, and combinations thereof) that is electrocatalytically active. Some other aspects of embodiments and/or embodiments of the present invention are directed to a composite material comprising a nanosize transition metal alloy and a carbonaceous matrix.

2 Claims, 11 Drawing Sheets

(51) Int. Cl.
*H01M 4/92* (2006.01)
*B22F 1/02* (2006.01)
*B22F 9/22* (2006.01)
*C22C 5/04* (2006.01)
*C22C 9/00* (2006.01)
*C22C 9/06* (2006.01)
*C22C 19/03* (2006.01)
*B82Y 30/00* (2011.01)

(56) References Cited

OTHER PUBLICATIONS

Alden et al.; Synthesis, Characterization, and Electrocatalytic Activity of PtPb Nanoparticles Prepared by Two Synthetic Approaches; J. Am. Chem. Soc. 2006, 10465-10471.
Abe et al.; Electroctaalytic Performance of Fuel Oxidation by Pt3Ti Nanoparticles; J. Am. Chem. Soc, 2008, 130, 5452-5458.

* cited by examiner

| Table A: Summary of Electrocatalytic Parameters ||||||||
|---|---|---|---|---|---|---|---|
| No. | Sample Designation | Example Designation | Pt [wt%] | $ESA_{H\,UPD}$ [$m^2/g_{cat}$] | Reaction Condition | $j_k$ IR-corrected [$mA/cm^2$] | $j_m$ IR-corrected [$A/mg_{Pt}$] |
| 1 | A[CPC35A1PtZ] | A | 17 | 44.5 | ORR | 2.435 | 1.084 |
| 2 | A[CPC35A1PtZ] | A | 17 | 44.5 | MOR | 6.000 | 2.05 |
| 3 | A[CPC35A1PtZ_K] | A-AcT | 20 | 37.4 | ORR | 2.345 | 0.876 |
| 4 | A[CPC36EPtZ] | A | 18 | 43.1 | ORR | 1.827 | 0.787 |
| 5 | A[CPC36EPtZKH] | A-AcT | 23 | 30.8 | ORR | 1.431 | 0.441 |
| 6 | A[CPC36EPtZK_tef] | A-AcT | 20 | 33.2 | ORR | 1.363 | 0.452 |
| 7 | A[CPC36EPtZL1K] | A-AcT | 20 | 51.7 | ORR | 0.878 | 0.454 |
| 8 | A[CPC46APtZL] | A | 18 | 35.0 | ORR | 1.852 | 0.648 |
| 9 | A[CPC46APtZL1K] | A-AcT | 20 | 35.8 | ORR | 1.002 | 0.358 |
| 10 | A[CPC46APtZLK1] | A-AcT | 20 | 28.6 | ORR | 0.903 | 0.258 |
| 11 | B[CPC33APts] | B | 9 | 37.5 | ORR | 1.703 | 0.639 |
| 12 | B[CPC33b1Pts] | B | 9 | 34.7 | ORR | 1.149 | 0.399 |
| 13 | B[CPC33A1PtSH] | B | 9 | 43.9 | ORR | 0.821 | 0.360 |
| 14 | B[CPC33APts] | B | 9 | 34.7 | ORR | 2.098 | 0.728 |
| 15 | B[CPC33APts] | B | 9 | 37.5 | ORR | 1.703 | 0.639 |
| 16 | B[CPC41B4Pts] | B | 9 | 20.5 | ORR | 1.786 | 0.366 |
| 17 | C[CPC35CPdz] | C | 31 (Pd) | 7.7 | ORR | 0.120 | 0.009 |
| 18 | C[CPC35DPdz] | C | 19 (Pd) | 21.6 | ORR | 0.124 | 0.027 |
| 19 | D[CPC41CBSPtZ] | D | - | - | - | - | - |
| 20 | E[CPC46APtZRuT] | E | 20 | 28.1 | ORR | 1.022 | 0.287 |
| 21 | E[CPC46APtZRuT] | E | 20 | 23.4 | MOR | 4.827 | 1.810 |
| 22 | F[CPC65A] | F | 11 | 62.1 | ORR | 1.226 | 0.761 |
| 23 | F[CPC65AL] | F | 11 | 61.1 | ORR | 1.202 | 0.735 |
| 24 | G[CPC26BPtL] | G | 20 | 19.9 | ORR | 1.764 | 0.353 |
| 25 | Ref[K1] | ETEC Corp.-AcT | 29 | 78.6 | ORR | 0.287 | 0.226 |
| 26 | Ref[K2] | ETEC Corp.-AcT | 29 | 83.9 | ORR | 0.246 | 0.207 |
| 27 | Ref[] | ETEC Corp. | 29 | 66.2 | MOR | 1.100 | 0.585 |

Legend: ORR – oxygen reduction reaction
HOR – hydrogen oxidation reaction
MOR – methanol oxidation reaction
Ref []– Reference catalysts, that is, commercially available catalysts from ETEK Corp.
ND – not determined
AcT – acid treated in 0.05 $H_2SO_4$ for 24 h

Fig. 12

ELECTROCATALYTIC COMPOSITE(S), ASSOCIATED COMPOSITION(S), AND ASSOCIATED PROCESS(ES)

This application claims priority to 21 Jul. 2011 by claiming the benefit of U.S. Provisional Patent Application No. 61/510,452 entitled "Electrocatalytic Composite(s), Associated Composition(s), and Associated Process(es)" filed on 21 Jul. 2011 in the names of Marjan Bele, Miran Gaberšček, Gregor Kapun, Nejc Hodnik, and Stanko Hačvar, which US provisional patent application is herein incorporated by reference in its entirety.

FIELD OF INVENTION

Aspects of embodiments and/or embodiments of the present invention generally relate to the field of chemical technology and more specifically to the field of electrocatalysis. Also, aspects of embodiments and/or embodiments of the present invention are directed to one or more of a composition having electrocatalytic activity, a composite material having electrocatalytic activity, a machine or equipment including a composition having electrocatalytic activity, a machine or equipment including a composite material having electrocatalytic activity, a process for making a composition having electrocatalytic activity, a process for making a composite material having electrocatalytic activity, a process for using a composition having electrocatalytic activity, and a process for using a composite material having electrocatalytic activity. Further, some aspects of embodiments and/or embodiments of the present invention are directed to a nanosize transition metal alloy (such as for example an alloy and/or one or more intermetallics comprising copper, cobalt, iron, nickel, palladium, platinum, ruthenium the like, and combinations thereof) that is electrocatalytically active. Some other aspects of embodiments and/or embodiments of the present invention are directed to a composite material comprising a nanosize transition metal alloy and a carbonaceous matrix.

BACKGROUND

Electrochemical devices realize an electric current from a change in one or more oxidation states during a chemical reaction. An electrochemical cell includes two types of electrodes—anodic and cathodic. An oxidation reaction occurs at the anodic electrode(s) while a reduction reaction occurs at the cathodic electrode(s).

A fuel driven electrochemical cell (hereinafter "fuel cell or fuel cells) is open system that consumes a fuel and oxygen source. Both are supplied to the fuel cell during its operation in which the fuel oxidizes at the anodic electrode(s) while at the same time the oxygen source reduces at the cathodic electrode(s). By regulating a supply of fuel and the oxygen source to a fuel cell, a user is able to controllably produce an electric current. Methanol, ethanol, and hydrogen are some examples of fuels usable in a fuel cell. Air and oxygen are some examples of oxygen sources usable in a fuel cell.

In a fuel cell having a proton conducting membrane (PCM), using hydrogen as the fuel, and air as the oxygen source, the hydrogen electrooxidizes at the anodic electrode(s) (diatomic hydrogen disassociates to protium $[H_2 \rightarrow 2H°]$ and the protium in turn ionizes to generate one electron per proton $[2H° \rightarrow 2H+ +2e-]$). The protons are transported from the anodic electrode(s) to the cathodic electrode(s) through the proton conducting membrane (PCM) while the electrons are transported from the anodic electrode(s) to the cathodic electrode(s) along the external circuit via a load. Oxygen from the air reduces at the cathodic electrode(s) (e.g., diatomic oxygen converts to oxygen anions by four electrons discharged during oxidation of hydrogen $[O_2 + 4e^- \rightarrow 2O^{2-}$ (with a 2- charge)]). The product of reaction of protons and oxygen anions on the cathodic electrode(s) is water $[2O^{2-} + 2H+ \rightarrow H_2O]$. An overall reaction (i.e., sum of half cell reactions at both types of electrodes) in a fuel cell with a proton conducting membrane theoretically produces current at a voltage very close to thermodynamic equilibrium voltage, that is, it operates at a voltage of about 1.23 V at 298 K. For decades, platinum (Pt) has been used as an electrocatalyst for the reduction of oxygen on the cathodic electrode(s) in hydrogen fuel cells. However, the reduction of oxygen at a Pt-cathodic electrode(s) occurs irreversibly that in turn causes high activation polarization losses that in turn significantly reduce fuel cell efficiency. There is a need for a new electrocatalyst having lower activation polarization losses while at the same time reducing cathodic electrode(s) platinum (Pt) content. Some alloys of Pt with transition metals (M) with an atomic ratio Pt/M=3:1 on activated carbon (hereinafter "Pt-M/C") exhibit a specific catalyst activity ($j_k$, IR-corrected) about 2.5 to about 3 times the specific catalyst activity ($j_k$, IR-corrected) of elemental platinum (Pt) on activated carbon (hereinafter "Pt/C"). Yet such improved specific catalyst activity ($j_k$, IR-corrected) is insufficient to justify a use of such fuel cells for automobile drive assemblies. It is estimated that at least 4-times higher specific catalyst activity ($j_k$, IR-corrected) and mass activity ($j_m$) with respect to Pt/C would be desirable in order for the fuel cells to be applicable in a commercial electric drive in automobiles. Detailed technical and economic parameters for cathodic electrode(s) electrocatalyst are set forth in B. Pivovar et al., "*Applied Science for Electrode Cost, Performance, and Durability*," in the 2007 Progress Report for the US Department of Energy (DOE) Hydrogen Program (http ://www.hydrogen.energy.gov/pdfs/progress07/v_a_4_pivovar.pdf22 Apr. 2011).

GB2190537A discloses an electrocatalyst from a platinum-copper alloy containing 15 to 50 atomic percent (at %) copper (the balance being platinum) supported on a suitable substrate. These catalysts have enhanced activity and improved maintainability than previously known platinum electrocatalysts. According to one method, both platinum and copper are deposited simultaneously on activated carbon or another type of electrically conductive substrate from a mixture of platinum salt solution and copper salt solution. According to another method, first platinum is deposited from the platinum salt solution and then copper is deposited from the copper salt solution. Heat treating is carried out in a reducing atmosphere at temperatures ranging between 600° C. and 900° C. The maximum IR corrected specific catalyst activity ($j_k$, IR-corrected) of these catalysts for the oxygen reduction reaction (ORR) is 0.108 mA/cm$_{ESA}^2$ at 0.9 V vs. reversible hydrogen electrode (RHE).

US2009/0114061A1 and US2009/0098420A1 disclose a preparation of nanoparticles with a "core-shell" morphology using two-component alloys and three-component alloys of platinum and non-noble transition metals. In paragraphs [0027] to [0029], it is emphasized that the atomic ratio of platinum to non-noble (alkali) transition metals (Pt/M(alkali)) of the alloys is not limited. One method is strictly limited to the use of classic platinum catalysts on activated carbon (Pt/C) that are mixed with a previously prepared solution of copper or copper and cobalt salts (preferably nitrates). The resulting slurry is then frozen using liquid nitrogen and evacuated. The resulting powder containing Pt/C and alkali elements (Cu, Co) is then annealed in a muffle furnace between 200° C. and 1000° C. in an inert atmosphere. A catalyst thus obtained is then etched in an acid either prior to application to an electrode in a fuel cell or after the preparation of a membrane-electrode assembly. The alloy composition changes during etching as a considerable amount of non-noble metals (Cu and/or Co) is removed. After etching with an acid, all catalysts prepared according to US2009/0114061A1 and US2009/0098420A1 contained between 79 at % and 86 at % platinum with the balance being non-noble alkali transition metals. The maximum specific catalyst activity ($j_k$, IR-corrected) and mass activity ($j_m$) of a catalyst with an initial composition $Pt_{25}Cu_{75}$ mounted after etching and ionic exchange directly in the fuel cell at 0.9 V vs. RHE to 1.964 milliampere per square centimeter platinum (mA/$cm^2_{Pt}$) and 0.413 ampere per milligram platinum (A/$mg_{Pt}$). U.S. Pat. No. 7,700,521B2 discloses a preparation of electrocatalysts on the basis of nanoparticles of Pt—Cu alloys on electrically conductive substrates for application in anodic electrode(s) (oxidation) and cathodic electrode(s) (reduction) reactions for the production of electric current in fuel cells. Hydrogen or a hydrogen containing gas (e.g., methanol) is used as fuel and oxygen or air is used as oxidant. The catalyst alloy comprises 50 weight percent (wt %) to 80 wt % Pt.

U.S. Pat. No. 7,422,994B2 discloses a synthesis and preparation of electrocatalysts based on nanoparticles of Pt—Cu—W alloys and Pt—Cu—Ni alloys on electrically conductive substrates for use in anodic electrode(s) (oxidation) and cathodic electrode(s) (reduction) reactions in fuel cells. The catalyst alloy comprises 50 wt % to 80 wt % of Pt.

Thus, there exists a need for composition(s) and/or composite material(s) that provide improved catalytic activity with lower concentration of noble metals. Further, there exists a need for machine(s) and/or equipment including such composition(s) and/or composite(s). Furthermore, there exists a need for process(es) for synthesizing such composition(s) and/or composite(s).

SUMMARY OF INVENTION

Some aspects of embodiments and/or embodiments of the present invention relate to a composite including an electrically conductive matrix or a partially electrically conductive matrix and nanoparticles (e.g., an alloyed and/or intermetallics(s) catalyst, alloyed and/or intermetallics(s) catalysts . . . etc.) as well as processes for making such composite. In some aspects, such processes include using one or more M(II) based salts (e.g., M=Cu, Co, Ni, Pd, Ru, Pt, Fe . . . etc.), and one or more active carbon sources (e.g., carbon, a material pyrolyzable to carbon {e.g., a glucose, starch, biomass . . . etc.} . . . etc.), one or more polyelectrolytes, and/or one or more surfactants. According to other aspects, a composite of an electrically conductive matrix or a partially electrically conductive matrix (e.g., carbonaceous matrix, electronically conductive carbonized phases . . . etc.) and nanoparticles of an alloyed and/or intermetallics(s) catalyst, alloyed and/or intermetallics(s) catalysts . . . etc. might be prepared in four stages:

a) a first stage involving mixing one or more M(II) based salts (e.g., M=Cu, Co, Ni . . . etc.), and one or more active carbon sources (e.g., carbon, a material pyrolyzable to carbon {e.g., a glucose, starch, biomass . . . etc.} . . . etc.), one or more polyelectrolytes, and/or one or more surfactants to form a viscous sol or hard gel that, when dried produces a xerogel.

b) a second stage involving pyrolysis of the xerogel of the first stage in a reducing atmosphere and/or inert atmosphere to form in situ a composite of porous carbon matrix and nanoparticles including a non-noble metal or alloy of one or more non-noble metals (e.g., Cu and/or Ni and/or Co and/or Fe and/or . . . etc.) that, when ground produces a composite particles containing metallic nanoparticles (e.g., non-noble metal and/or alloy=Cu and/or Ni and/or Co and/or . . . etc.) and a porous carbon matrix.

c) a third stage involving a palladization and/or platinization and/or ruthenization and/or . . . etc. of the metallic nanoparticles of the composite of the second stage.

d) a fourth stage involving a hardening and/or tempering in a reducing atmosphere and/or inert atmosphere of the palladized and/or platinized and/or ruthenized and/or copperized and/or . . . etc. composite of the third stage.

Other aspects of embodiments and/or embodiments of the present invention relate to a composite including an electrically conductive matrix or a partially electrically conductive matrix and superficially structured nanoparticles (e.g., an alloyed catalyst, alloyed catalysts, intermetallics . . . etc.). The superficially structured nanoparticles can include a core of a non-noble metal or alloy of one or more non-noble metals (e.g., Cu and/or Ni and/or Co and/or Fe and/or . . . etc.) a shell of a noble metal or an alloy and/or one or more intermetallics of one or more noble metals (e.g., Pd, Ru, Pt . . . etc.). According to some aspects, such superficially structured nanoparticles can include a core of a structured portion or semi-structured portion (e.g., a crystalline alloy including atoms of two or more metals randomly distributed in a cubic Fm$\bar{3}$m structure) while the shell can include a structured portion—intermetallics (e.g., atoms of two or more metals order in an alternating manner in cubic Pm$\bar{3}$m structure or tetragonal and orthorhombic arrangements {e.g. P4/mnc structure, P4$_2$/mmc structure, I4/mmm structure, P4/mmm structure, P2/m structure . . . etc.} . . . etc.). According to some other aspects, such superficially structured nanoparticles can include a core including a non-structured portion (e.g., unarranged or disordered Fm$\bar{3}$m structure) while the shell can include a structured portion (e.g., arranged or ordered Pm$\bar{3}$m structure or tetragonal and orthorhombic arrangements {e.g., P4/mnc structure, P4$_2$/mmc structure, I4/mmm structure, P4/mmm structure, P2/m structure . . . etc.} . . . etc.). According to yet other aspects, a mass fraction of the structured portion can range from about 0 to about 1. According to yet other aspects, such a composite including carbon and superficially structured nanoparticles can have a specific activity ($j_k$) for an oxygen reduction reaction (ORR) ranging from about 0.27 mA/cm$^2$ to about 4.6 mA/cm$^2$, alternatively ranging from about 3.6 mA/cm$^2$ to about 4.6 mA/cm$^2$. In analogous aspects, such a composite including carbon and superficially structured nanoparticles can have a specific activity ($j_k$) for methanol oxidation reaction (MOR) ranging from about 1.1 mA/cm$^2$ to about 6.0 mA/cm$^2$. According to still yet other aspects, such a composite including carbon and superficially structured nanoparticles can have an IR-drop corrected mass activity ($j_m$) for the oxygen reduction reaction (ORR) ranging from about 0.009 A/$mg_{Pt}$ to about 1.56 A/$mg_{Pt}$, alternatively ranging from about 0.44 mA/cm$^2$ to about 1.56 A/$mg_{Pt}$.

Some other aspects of embodiments and/or embodiments of the present invention relate to a composite including an electrically conductive matrix or a partially electrically conductive matrix (e.g., carbonaceous matrix, electronically conductive carbonized phases . . . etc.) and nanoparticles including two or three component transition metal deposited alloys. Such alloys might include one or two more noble transition metals and/or one or two non-noble (less noble) transition metals that encompass the following elements from the periodic system of elements: Ti, V, Cr, Mn, Fe, Co, Ni, Cu, Ru, Rh, Pd, Ag, In, Sn, Sb, Pb, Bi, Os, Ir, Pt, Au . . . etc.).

In yet other aspects of any of the above aspects of embodiments and/or embodiments, a composite including an electrically conductive matrix or a partially electrically conductive matrix (e.g., carbonaceous matrix, electronically conductive carbonized phases . . . etc.) and nanoparticles exhibit a potential shift towards more positive values by or for about 30 mV to about 40 mV (see, e.g., FIG. 9). Such potential shift towards more positive values might be due to one or more interaction between one or two noble metals and/or one or two non-noble (less noble) metals.

In still yet other aspects of any of the above aspects of embodiments and/or embodiments, nanoparticles can range in size from about 2 nm to about 200 nm; alternatively can range in size from about 10 nm to about 60 nm. In related aspects, a composite including an electrically conductive matrix or a partially electrically conductive matrix (e.g., carbonaceous matrix, electronically conductive carbonized phases . . . etc.) and nanoparticles can exhibit a specific activity independent of an electrochemical surface area (ESA) in the range from about 100 to about 700 $cm^2/mg_{Pt}$ (see e.g., FIG. 10).

As yet other aspects of any of the above aspects of embodiments and/or embodiments, heating materials to form a composite including an electrically conductive matrix or a partially electrically conductive matrix (e.g., carbonaceous matrix, electronically conductive carbonized phases . . . etc.) and nanoparticles of an alloyed catalyst or catalysts can be done at temperatures between 600° C. and 800° C. so as to tailor a structure of an alloy or alloys to become completely unarranged (disordered), also known as a structure typical for solid solutions.

As still yet other aspects of any of the above aspects of embodiments and/or embodiments, heating materials to form a composite including an electrically conductive matrix or a partially electrically conductive matrix (e.g., carbonaceous matrix, electronically conductive carbonized phases . . . etc.) and nanoparticles of an alloyed catalyst or catalysts at temperatures between about 500° C. and about 1000° C., alternatively between about 600° C. and about 800° C., can facilitate good electronic contact among such electrically conductive matrixes and the nanoparticles. Likewise, such heating can assure an embedding of the nanoparticles within such electrically conductive matrixes in a firm manner.

In related examples of other aspects of any of the above aspects of embodiments and/or embodiments, an additional quenching after a heating step might be done at high enough rates (e.g., from about 10° C./min to about 200° C./min or more, if desirable) to facilitate a formation of platinum skin structure on arranged (e.g. ordered $Pm\bar{3}m$ or ordered P4/mnc or ordered $P4_2$/mmc or ordered I4/mmm or ordered P4/mmm or ordered P2/m . . . etc.) structures. In related examples of still other aspects of any of the above aspects of embodiments and/or embodiments, cooling materials after a heating step can be done at a slow enough rates (from about 1° C./min to about 10° C./min or, if necessary) to facilitate a formation of arranged (e.g., ordered $Pm\bar{3}m$ or P4/mnc or $P4_2$/mmc or I4/mmm or P4/mmm or P2/m . . . etc.) structures. Alternatively, the arranged structures are formed by keeping a precursor composite containing the alloyed catalyst at temperatures between about 200° C. and about 700° C., alternatively between about 300° C. and about 600° C. for a period of about 1 h to about two weeks.

Also, aspects of embodiments and/or embodiments a composite including an electrically conductive matrix or a partially electrically conductive matrix and nanoparticles and a synthesis of such composite for electrochemical reactions of oxygen reduction, methanol oxidation, hydrogen oxidation, or combinations thereof in the presence of carbon monoxide. According to some aspects, a synthesis comprises a method of synthesis of crystalline nanoparticles of binary and/or ternary alloys of transition metal elements in the periodic table of elements (e.g., copper, cobalt, nickel, iron, palladium, platinum . . . etc.) embedded in porous electrically conductive matrix or a partially electrically conductive matrix (e.g., carbonaceous matrix, electronically conductive carbonized phases . . . etc.) with a controlled size and/or composition of alloy nanoparticles and porosity of the conductive matrix (e.g., carbonaceous matrix, electronically conductive carbonized phases . . . etc.), wherein the particles can be embedded and substantially equally distributed within the conductive matrix (e.g., carbonaceous matrix, electronically conductive carbonized phases . . . etc.). In aspects, the method provides for a preparation of nanoparticles of alloys with a controlled arrangement of nanoparticle sizes and with a controlled distribution of concentration of elements on the surface of nanoparticles and within them as well as with a formation of certain crystal structures both on the surface and within an individual nanoparticle. This particular surface structures not only can improve the catalytic activity of the nanoparticles but also can slow down dealloying of non-noble transition metal (e.g., Group Ib {e.g., copper . . . etc.}, Group VIII {e.g., cobalt, nickel . . . etc.}, Group VIIa {e.g., manganese . . . etc.}, Group VIa {e.g., chromium . . . etc.} . . . etc.) from the inner of nanoparticles.

(α) By a synthesis of a catalyst as nanoparticles to have a preselected morphology configured to allow reactant molecules to reach the highest number possible of active catalyst sites per unit of active metal mass. FIG. 4 is a schematic presentation of the dependence of electrochemically active surface area (ESA) on an equivalent nanoparticle diameter basis for a catalyst synthesized to various preselected nanoparticles morphologies.

(β) By a synthesis of a catalyst having a preselected morphology to have active catalyst sites and/or active catalyst components located predominantly on the surface of the nanoparticles. For example, location of active catalyst sites and/or active catalyst components predominantly on the surface might be realized by synthesizing a catalyst having a preselected morphology in a "core-shell" configuration or a "skin" configuration. FIG. 5 is a schematic presentation of the dependence of the electrochemically active surface area (ESA) of a catalyst having a preselected morphology with a location of the active catalyst sites and/or active catalyst components: (i) throughout the volume of a nanoparticle, (ii) in the shell of the nanoparticles, and (iii) in the skin of the nanoparticles while using a chemical composition gradient within a given morphology of a particle (nanocrystalline).

(γ) By a synthesis of nanoparticles of a two-component alloy and/or nanoparticles of a three-component alloy. Such nanoparticles are synthesized to have a preselected morphology and/or to have a preselected surface structure of any one of a one-transition metal systems, two-transition metal systems, and/or three-transition metal systems (see e.g., FIG. 6).

When the electrocatalysts are prepared from a metal or alloy as crystalline nanoparticles on an electrically conductive substrate (e.g., activated carbon, graphitized carbon . . . etc.), each crystal surface might have a somewhat different arrangement of atoms and thus a different distance between atoms (see e.g., FIG. 6). Consequently, such different atomic arrangement can create slight electronic structure differences among active catalyst sites and/or active catalyst components having different surfaces that, in turn, can influence electrocatalytic activity. It follows, that morphologically distinct crystals as well as distinct crystallographic surfaces (e.g., crystallographic planes) can have a different electrocatalytic activity.

Nanosize particles of crystalline alloys can be characterized by further complexity. For example, an arrangement of the atoms, distances between the atoms, and/or coordination of the atoms of the elements comprising an alloy can be different for each distinct particle morphology and/or crystallographic surface (e.g., crystallographic plane). FIG. 6 shows a model surface structure of a crystalline $PtCu_3$ alloy. It has also been demonstrated that the surface structure of a binary Pt-M (M=non-noble transition metal) alloy can change depending on whether it is exposed to a reducing atmosphere or an oxidizing atmosphere. In a reducing atmosphere, Pt segregates to and is predominately present at the surface of a nanoparticle. In an oxidizing atmosphere, an oxide of the non-noble metal segregates to and is predominately present at the surface of a nanoparticle while Pt is below the oxide [Ref.: Rentao Mu, Qiang Fu, Hongyang Liu, Dali Tan, Runsheng Zhai, Xinhe Bao, Reversible surface structural changes in Pt-based bimetallic nanoparticles during oxidation and reduction cycles, Applied Surface Science 255 (2009) 7296-7301].

X-ray Photoelectron Spectroscopy (XPS) can be used to investigate the chemical composition of various surfaces. FIG. 7 shows spectra of two catalyst samples (cyan line and amber line) compared with a commercially available Pt/C catalyst having a 2-3 nm particle size (ultra pink line) and Pt nanoparticles (blue line). Each of the two catalyst samples comprised a Pt—Cu alloy nanoparticles (particle size about 20 nm) supported on a graphitized carbon substrate and was prepared using methods according to aspects of embodiments and/or embodiments of the present invention. Except for the commercially available Pt/C catalyst, the spectra of catalysts comprising nanoparticles supported on a substrate are characterized by wider asymmetric peaks. Such peaks are characteristic of the presence of $Pt^0$ (Pt $4f_{7/2}$ 71.2-72.2 electron volts (eV)) and $Pt^{4+}$ (Pt $4f_{7/2}$ 74.3-75.5 eV) in oxide phases of $PtO_2$ or $Pt(OH)_4$. In the commercially available Pt/C catalyst having smaller nanoparticles (ultra pink line), the peak for the transition Pt $4f_{7/2}$ is shifted by almost 1 eV towards higher binding energy, whereas this peak for the Pt nanoparticles (blue line) and two catalyst samples (cyan line and amber line) are substantially aligned. In contrast, the peak for the transition Pt $4f_{5/2}$ for the commercially available Pt/C catalyst (ultra pink line) and two catalyst samples (cyan line and amber line) are substantially aligned, whereas this peak for the Pt nanoparticles (blue line) is at a lower binding energy of about 0.3 eV.

Synthesis of catalysts using methods according to aspects of embodiments and/or embodiments of the present invention and catalysts according to aspects of embodiments and/or embodiments of the present invention might be presented by illustrating the changes in (i) morphology, structure, and/or composition of a catalyst precursor and/or (ii) the changes in morphology, structure, and/or composition of a catalyst. FIG. 8 shows changes in x-ray diffraction patterns (herein after "diffraction pattern") during a variety of stages of a synthesis of a surface alloy $PtCu_3$ on a Ni core applied on an activated carbon substrate ($PtCu_3$/Ni/C). Curve (a) of FIG. 8 is the diffraction pattern after the application Ni-nanoparticles on the activated carbon substrate. Curve (b) of FIG. 8 is the diffraction pattern after the application and oxidization of Cu at the surface of Ni-nanoparticles of curve (a) to form a shell comprising copper and copper oxide(s) on the Ni-nanoparticles. Curve (c) of FIG. 8 is the diffraction pattern after the a hardening and tempering in a reducing atmosphere of the Cu coated Ni-nanoparticles of curve (b) to transform the shell comprising copper and copper oxide(s) to a shell comprising a Cu—Ni alloy as demonstrated by a shift of the reflection peaks towards lower angles. Also suggested by curve (c) of FIG. 8 is the presence of Cu on the surface of this Cu—Ni alloy that might be due to its segregation. Curve (d) of FIG. 8 is the diffraction pattern after the application of Pt at the surface of the Cu coated Ni-nanoparticles of curve (c) to transform the shell comprising Cu—Ni alloy to a shell comprising a Cu—Pt alloy as suggested by the complete disappearance of the Cu reflections and appearance of reflections typical of Cu—Pt alloy(s) and of pure Ni: Based on curve (d) of FIG. 8, it appears that substantially all of the Cu from the Cu—Ni alloy combined with the applied Pt to form Cu—Pt alloy(s). Curve (e) of FIG. 8, which including reflections typical of Fm3̄m and Pm3̄m structures of Cu-Pt alloys, is the diffraction pattern after a hardening and tempering of the Pt/Cu coated Ni-nanoparticles of curve (d). As demonstrated by the changing diffraction patterns of curves (a)-(e) of FIG. 8 catalysts according to aspects of embodiments and/or embodiments of the present invention might be synthesized using methods according to aspects of embodiments and/or embodiments of the present invention configured for predetermining any one of the (i) morphology, structure, and/or composition of a catalyst precursor and/or (ii) the morphology, structure, and/or composition of a catalyst. In this manner, using one or more prescribed methods for manipulating morphology, structure, and/or composition according to aspects of embodiments and/or embodiments of the present invention provides the capability to form one or more predetermined precursor compositions and/or one or more predetermined precursor composite materials that are configured for resulting in catalytically active phases. Further, using one or more prescribed methods for manipulating morphology, structure, and/or composition according to aspects of embodiments and/or embodiments of the present invention provides the capability to form one or more predetermined compositions and/or one or more predetermined composite materials that are configured for resulting in catalytically active phases. Some examples of such a predetermined precursor compositions and/or predetermined precursor composite materials and/or predetermined compositions and/or predetermined precursor composite materials are the shapes having prescribed morphologies, structures, and/or compositions that can result in structured surface area on the surface of the core from non-noble metal nanoparticles as shown in FIG. 8. Advantageously, according to aspects of embodiments and/or or embodiments of the present invention, compositions and/or or composite materials configured to be catalytically active can be synthesized while at the same time facilitating economically attractive catalysts by considerably reducing noble metal content.

Catalysts synthesized as described herein exhibited considerably better activity and stability for the oxygen reduction reactions (ORR), hydrogen oxidation reactions (HOR) in the presence of CO, $N_2O$ reduction reaction, CO oxidation reaction, and/or methanol oxidation reaction (MOR).

FIG. 9 shows polarization curves for the oxygen reduction reactions (ORR) obtained using the rotating disc electrode (RDE) method with a commercially available Pt/C catalyst and the catalyst according to aspects of embodiments and/or embodiments of the present invention synthesized using methods according to aspects of embodiments and/or embodiments of the present invention described herein.

FIG. 10 shows results of catalytic tests of samples of catalysts according to aspects of embodiments and/or embodiments of the present invention synthesized using methods according to aspects of embodiments and/or embodiments of the present invention described herein in comparison with the activity of the reference commercially available Pt/C catalyst and in comparison with the activity of several Pt-M alloys/C indicated in literature. It has been found that catalyst according to aspects of embodiments and/or embodiments of the present invention synthesized using methods according to aspects of embodiments and/or embodiments of the present invention described herein typically exceed the IR-corrected specific catalyst activity ($j_k$, IR-corrected) of the polycrystalline Pt (points along the straight line with greatest gradient) when they have a structured alloy on the surface of nanoparticles. When an alloy is not structured on the surface, catalyst samples have an IR-corrected specific catalyst activity ($j_k$, IR-corrected) comparable to that of the polycrystalline Pt. Further, FIG. 10 shows that it is theoretically possible to reach the mass activity ($j_m$) of the so synthesized catalysts above about 1.9 A/$mg_{Pt}$ at an electrochemically active surface area of the catalyst amounting to 80 $m^2/g_{Pt}$. At the theoretically possible electrocatalytically active surface area (ESA) of a "skin"-type Pt catalyst of 153 $m^2/g_{Pt}$ (see e.g., FIG. 5) the mass activity would be 3.58 A/$mg_{Pt}$. The slope of each straight line represents the IR-corrected specific catalyst activity ($j_k$, IR-corrected) of the catalyst (mA/$cm^2$).

FIG. 11 shows X-ray diffraction patterns of catalyst at final stage of a synthesis process as described in Example A. According to some other aspects, such structured nanoparticles include a disordered Fm$\bar{3}$m structure and an ordered Pm$\bar{3}$m structure. According to yet other aspects, a mass fraction of the structured portion can range from about 0 to about 1.

Numerous other aspects of embodiments, embodiments, features, and advantages of the present invention will appear from the following description and the accompanying drawings. In the description and/or the accompanying drawings, reference is made to exemplary aspects of embodiments and/or embodiments of the invention which can be applied individually or combined in any way with each other. Such aspects of embodiments and/or embodiments do not represent the full scope of the invention. Reference should therefore be made to the claims herein for interpreting the full scope of the invention. In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a disclosure in this specification of a range of from about 1 to 5 shall be considered to support claims to any of the following ranges: 1-5; 1-4; 1-3; 1-2; 2-5; 2-4; 2-3; 3-5; 3-4; and 4-5. Also in the interest of brevity and conciseness, it is to be understood that such terms as "is," "are," "includes," "having," "comprises," and the like are words of convenience and are not to be construed as limiting terms and yet may encompass the terms "comprises," "consists essentially of," "consists of," and the like as is appropriate.

These and other aspects, advantages, and salient features of the present invention will become apparent from the following description, the accompanying drawings, and the appended claims.

BRIEF DESCRIPTION OF DRAWINGS

The drawings referenced herein form a part of the specification. Features shown in the drawings are meant to be illustrative of some, but not all, embodiments of the invention, unless otherwise explicitly indicated, and implications to the contrary are otherwise not to be made. Although like reference numerals correspond to similar, though not necessarily identical, components and/or features in the drawings, for the sake of brevity, reference numerals or features having a previously described function may not necessarily be described in connection with other drawings in which such components and/or features appear.

According to some other aspects, such structured nanoparticles includes a disordered $Fm\overline{3}m$ structure and an ordered $Pm\overline{3}m$ structure. According to yet other aspects, a mass fraction of the structured portion can range from about 0 to about 1; and FIG. 12 includes a summary of sample characteristics and electrocatalytic parameters (e.g., composition (Pt wt %); electrochemically active surface area ($ESA_{H_{UPD}}$); reaction conditions; IR-corrected specific catalyst activity ($j_k$, IR-corrected); and IR-corrected mass activity" ($j_m$, IR-corrected) for samples according to aspects of embodiments and/or embodiments of the present invention as well as comparative samples.

DESCRIPTION

In the following description of exemplary aspects of embodiments and/or embodiments of the invention, reference is made to the accompanying drawings that form a part hereof, and in which are shown by way of illustration specific aspects of embodiments and/or embodiments in which the invention may be practiced. While these aspects of embodiments and/or embodiments are described in sufficient detail to enable those skilled in the art to practice the invention, it will nevertheless be understood that no limitation of the scope of the present disclosure is thereby intended. Alterations and further modifications of the features illustrated herein, and additional applications of the principles illustrated herein, which would occur to one skilled in the relevant art and having possession of this disclosure, are to be considered within the scope of this disclosure. Specifically, other aspects of embodiments and/or embodiments may be utilized, logical changes (e.g., without limitation, any one or more of chemical, compositional {e.g., without limitation, any one or more of chemicals, materials, . . . and the like}, electrical, electrochemical, electromechanical, electro-optical, mechanical, optical, physical, physiochemical, . . . and the like) and other changes may be made without departing from the spirit or scope of the present invention. Accordingly, the following description is not to be taken in a limiting sense, and the scope of aspects of embodiments and/or embodiments of the present invention are defined by the appended claims. It is also understood that terms such as "top," "bottom," "outward," "inward," and the like are words of convenience and are not to be construed as limiting terms.

Figure 1:
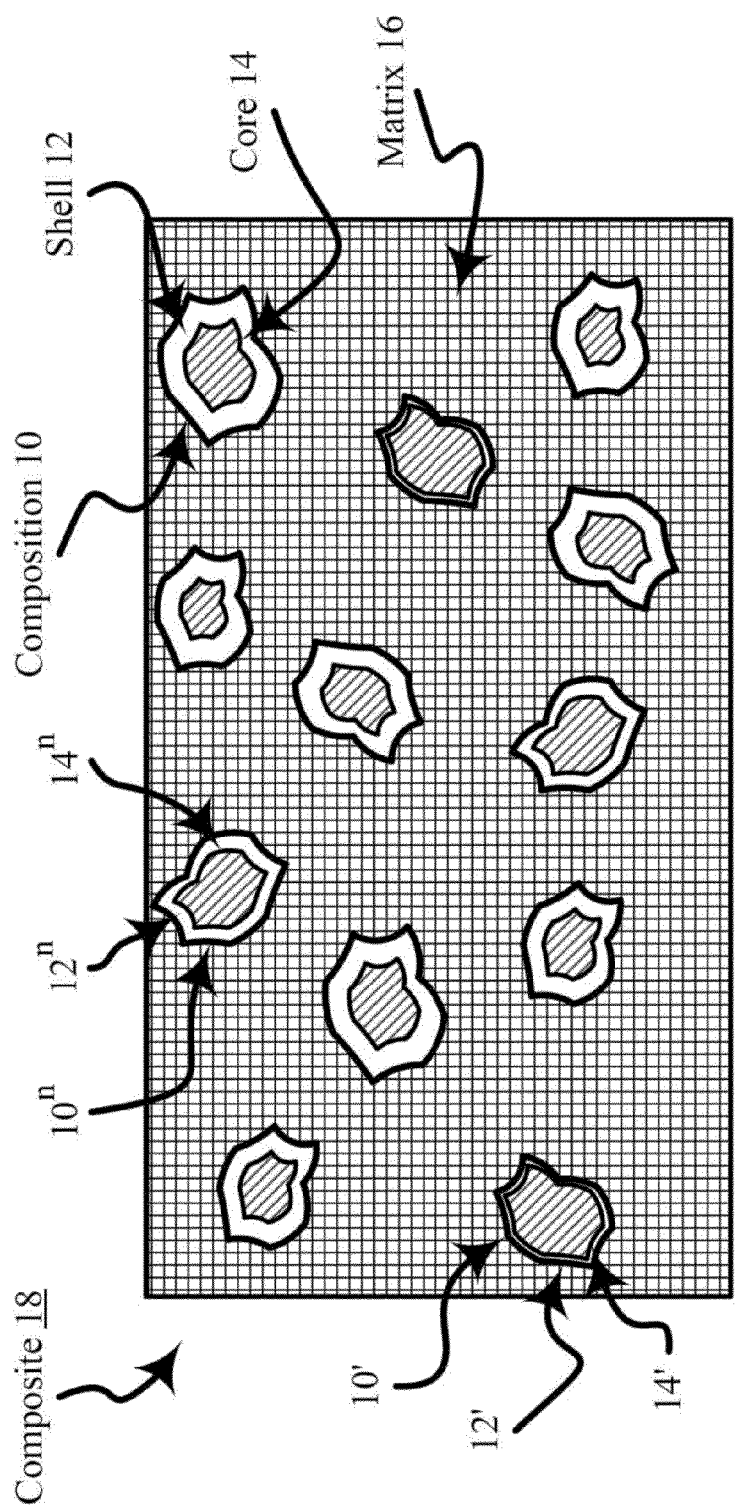
FIG. 1 is a schematic of a cross-section through of a composite of (a) a matrix, the matrix being at least partially to substantially completely electrically conductive; and (b) a composition comprising nanoparticles including a shell and a core, the shell covering some or all of the core, according to aspect of embodiments and/or embodiments of the present invention according to aspects of embodiments and/or embodiments of the present invention.
Figure 3:
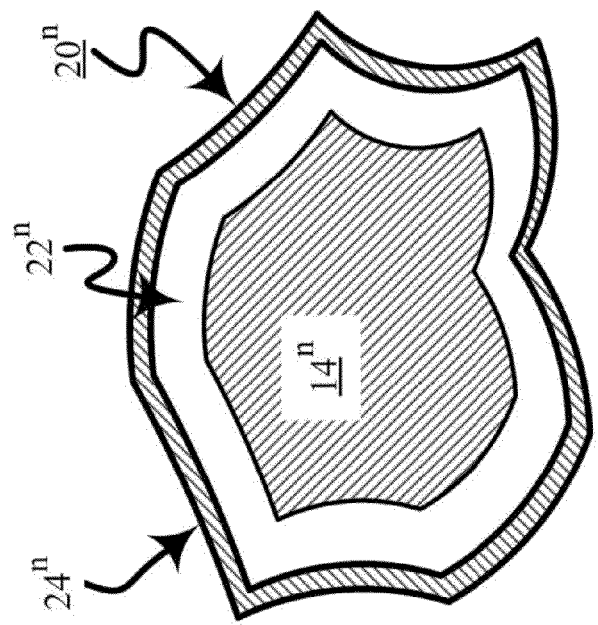
FIG. 3 is a schematic of a cross-section through of a precursor composition comprising a plurality of shell precursors and a core, each shell precursor covering some or all of a previous shell precursor and/or the core.
Figure 2:
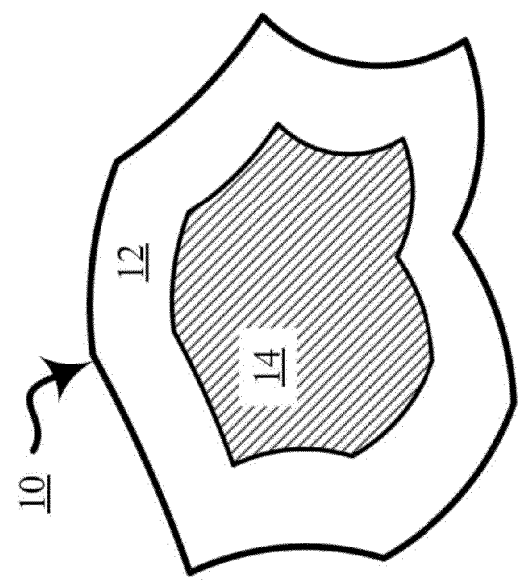
FIG. 2 is a schematic of a cross-section through of a composition comprising a shell and a core, the shell covering some or all of the core, according to aspect of embodiments and/or embodiments of the present invention according to aspects of embodiments and/or embodiments of the present invention.
Figure 4:
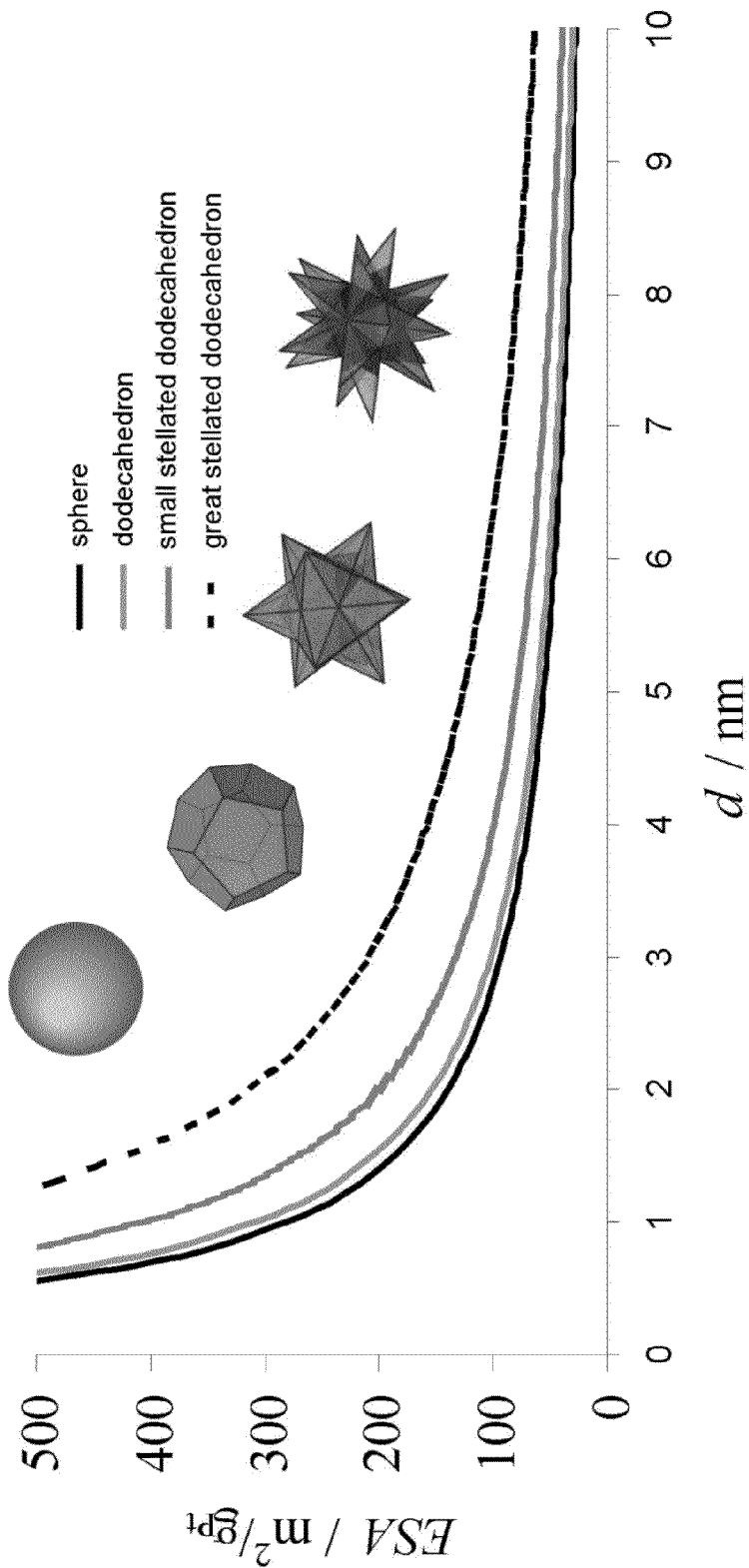
FIG. 4 illustrates the electrochemically active surface area (ESA) as a function of size for nanoparticles having various morphologies according to aspects of embodiments and/or embodiments of the present invention.
Figure 5:
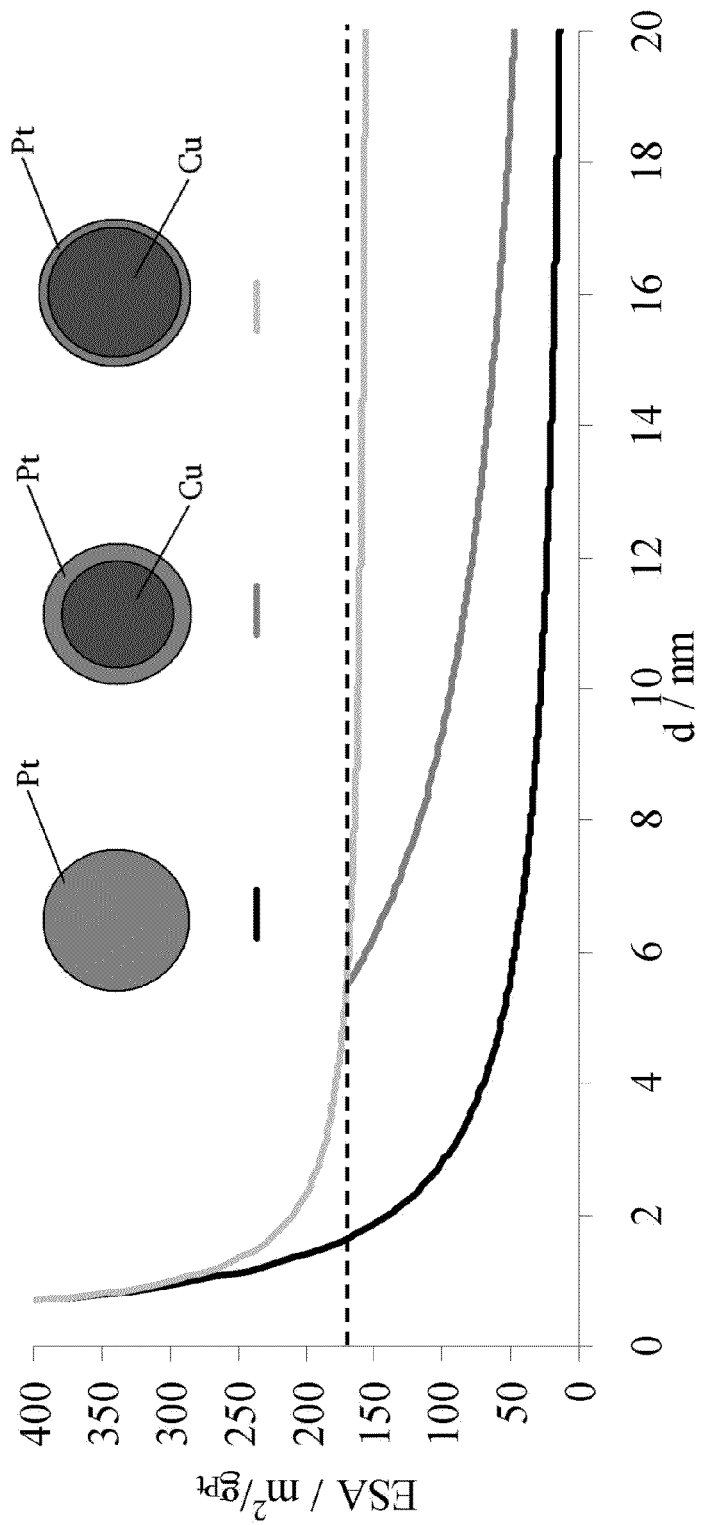
FIG. 5 illustrates the electrochemically active surface area (ESA) as a function of size for nanoparticles having a spherical morphology and being solid platinum (Pt) with no shell and a platinum (Pt) shell of two distinct thickness on a copper (Cu) core according to aspects of embodiments and/or embodiments of the present invention.
Figure 6:
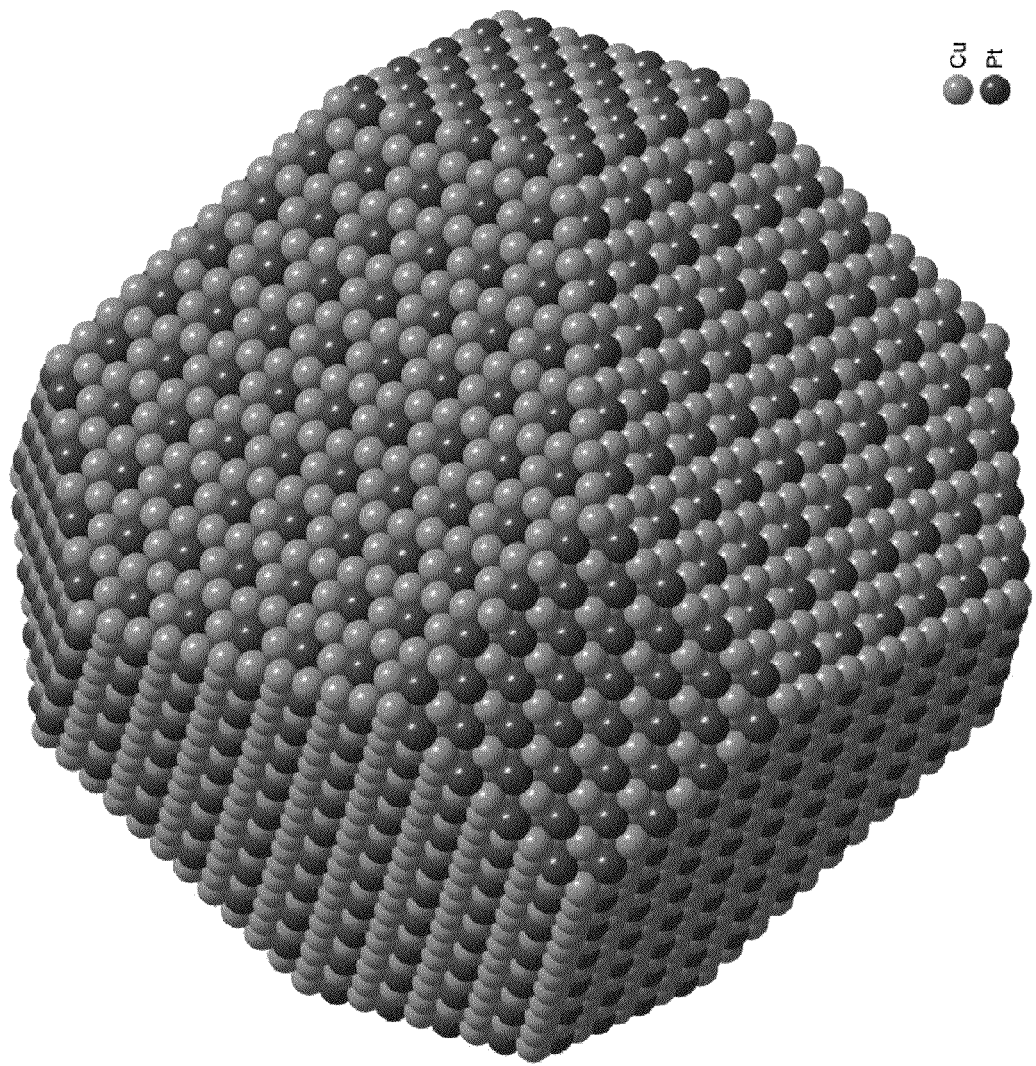
FIG. 6 is a schematic of an idealized three dimensional (3D) model of an about 7 nm cuboctahedral $PtCu_3$ crystal with a Pm$\bar{3}$m structure.
Figure 7:
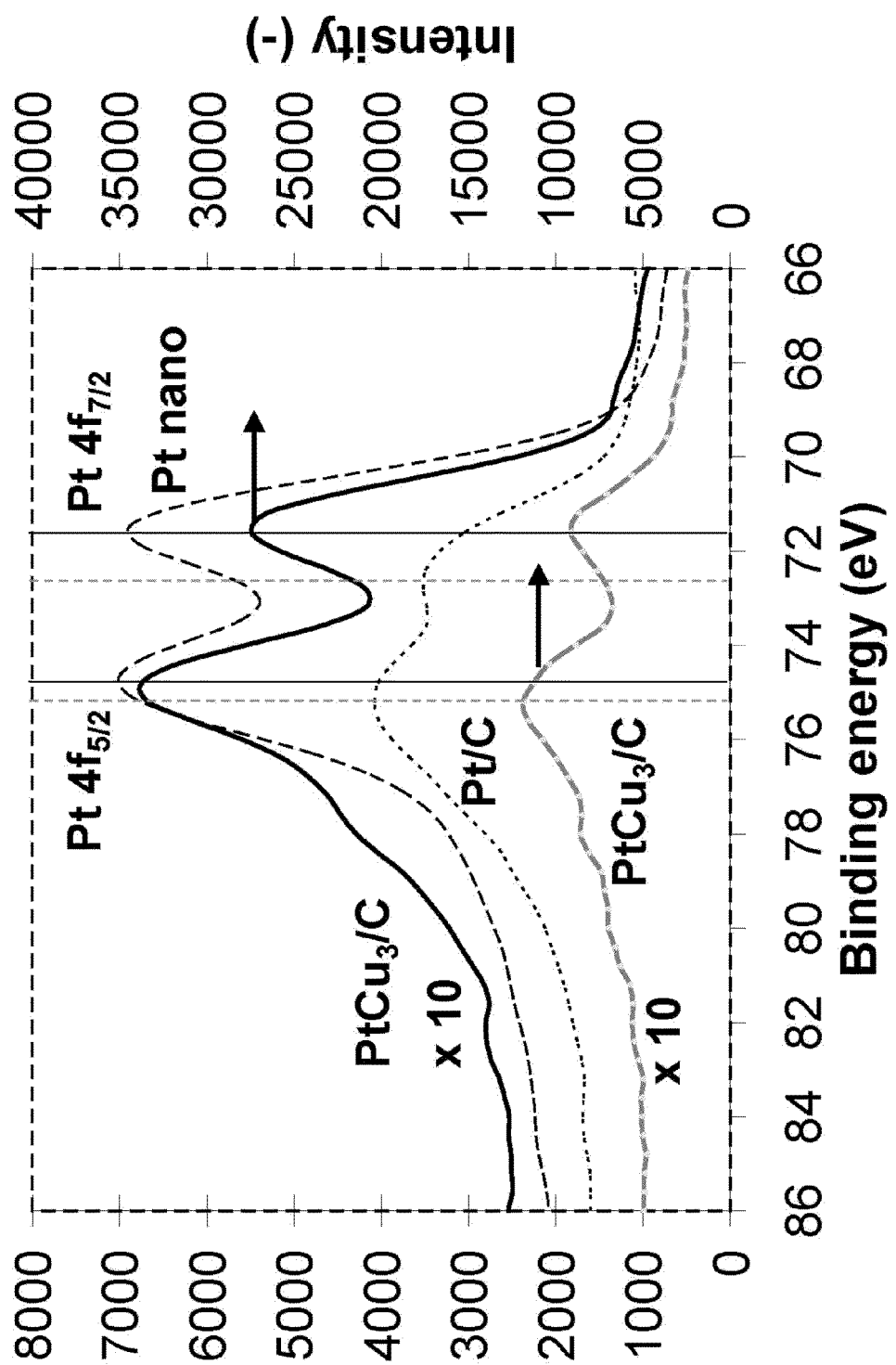
FIG. 7 shows the XPS spectra for two distinct Pt-Cu alloy/C catalysts according aspects of embodiments and/or embodiments of the present invention and, for comparison, the XPS spectra of a conventional Pt/C catalyst and reference Pt nanoparticles.
Figure 8:
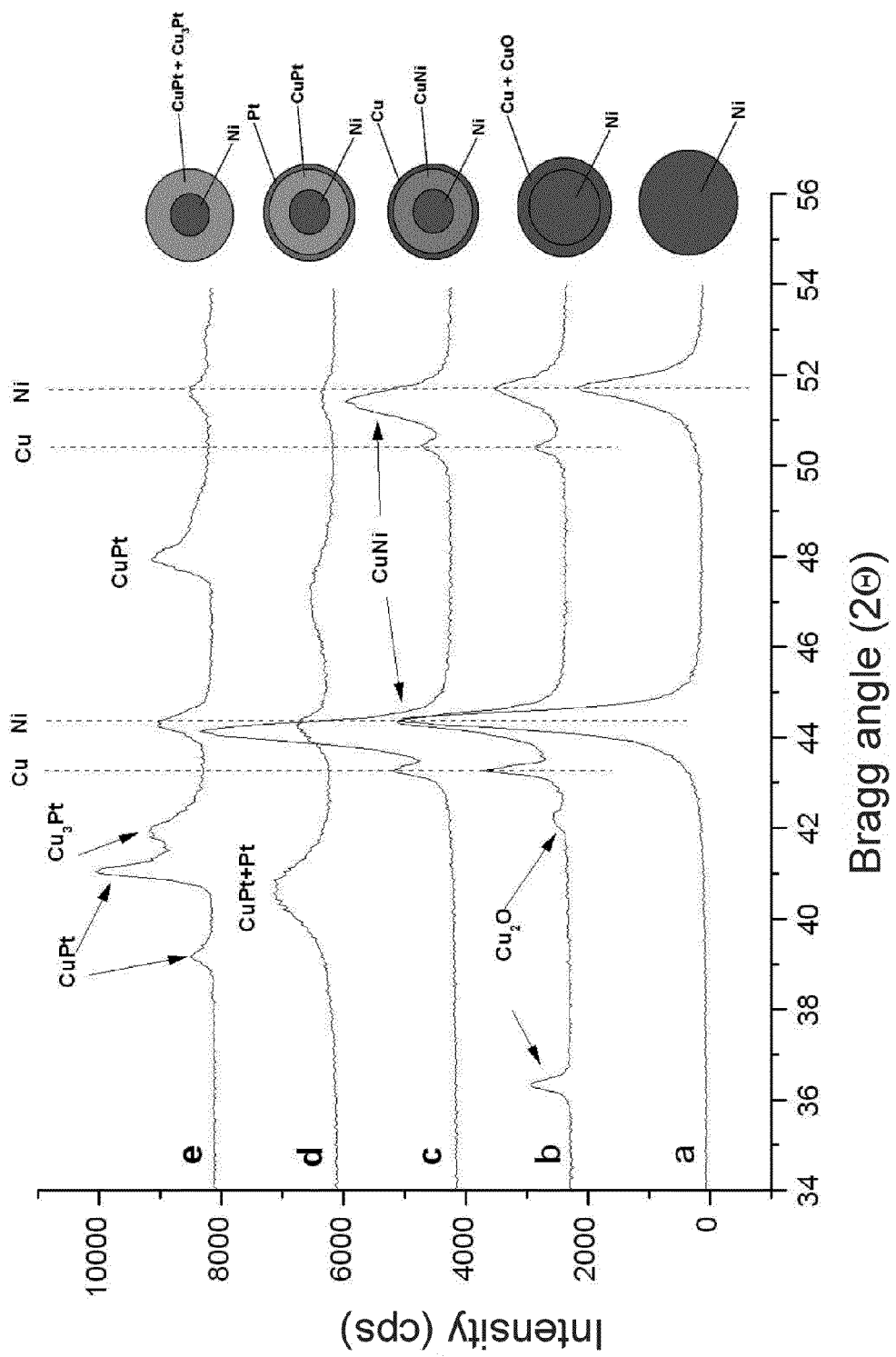
FIG. 8 shows the X-ray diffraction patterns of catalyst precursor compositions and/or catalyst compositions at various stages of a multi-stage synthesis process of a three(3)-component catalyst composition (the compositions, synthesis, and composite being according to aspects of embodiments and/or embodiments of the present invention) as described in Example D: (a) nickel nanoparticles obtained after stage 2; (b) alloyed nanoparticles obtained after additional treatment with copper; (c) alloyed nanoparticles treated with copper obtained after heating; (d) nanoparticles obtained after platinization—stage 3; and (e) three(3)-component nanoparticles obtained after stage 4.
Figure 9:
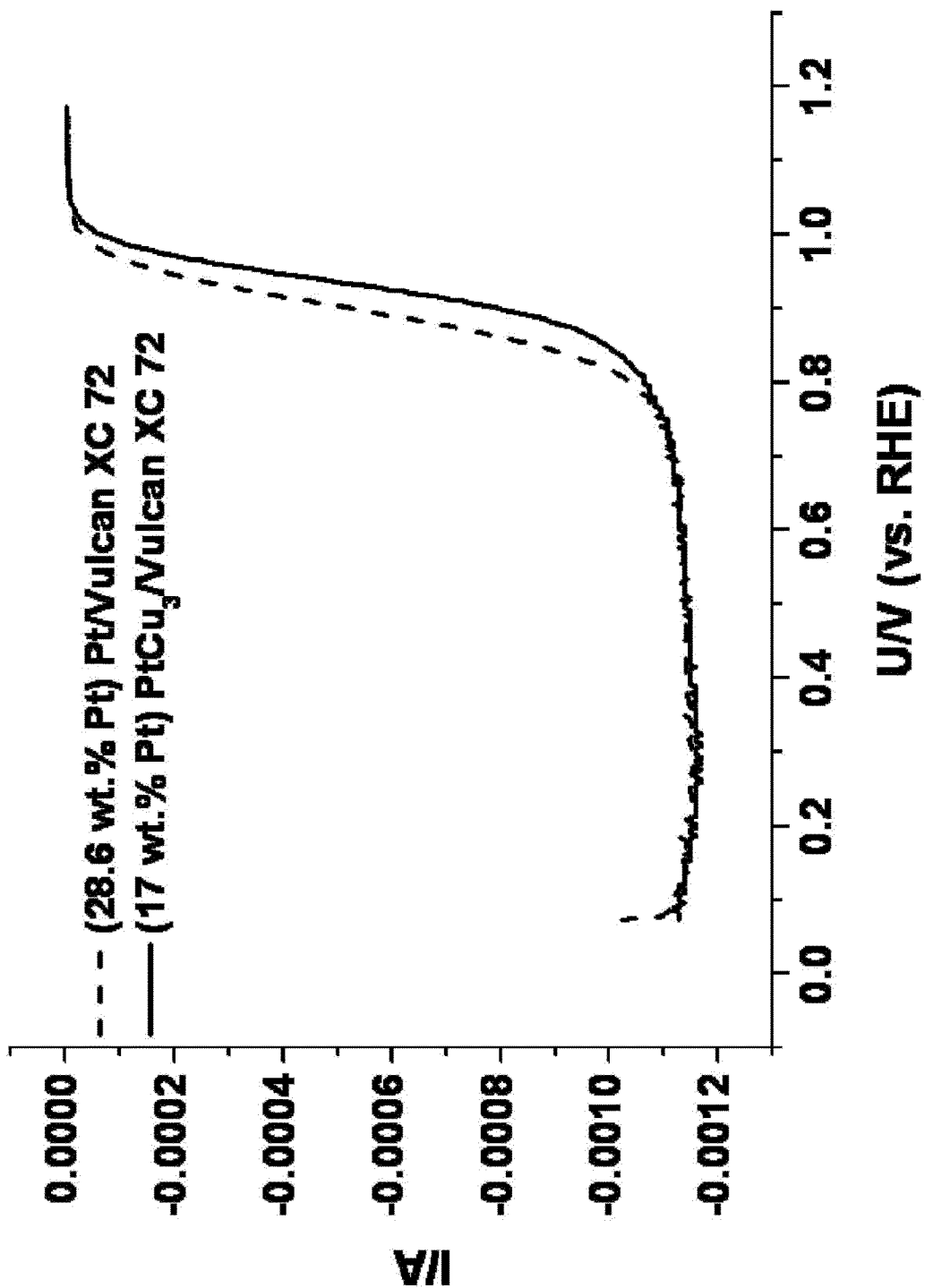
FIG. 9 shows the polarization curves of 28.6 wt % Pt/(Vulcan XC 72) composite and a 17 wt % Pt in $PtCu_3$/(Vulcan XC 72) composite (both according to aspects of embodiments and/or embodiments of the present invention) for cathodic oxygen reduction reaction (ORR) (The potential versus RHE having been corrected for the ohmic drop of the electrolyte)
Figure 10:
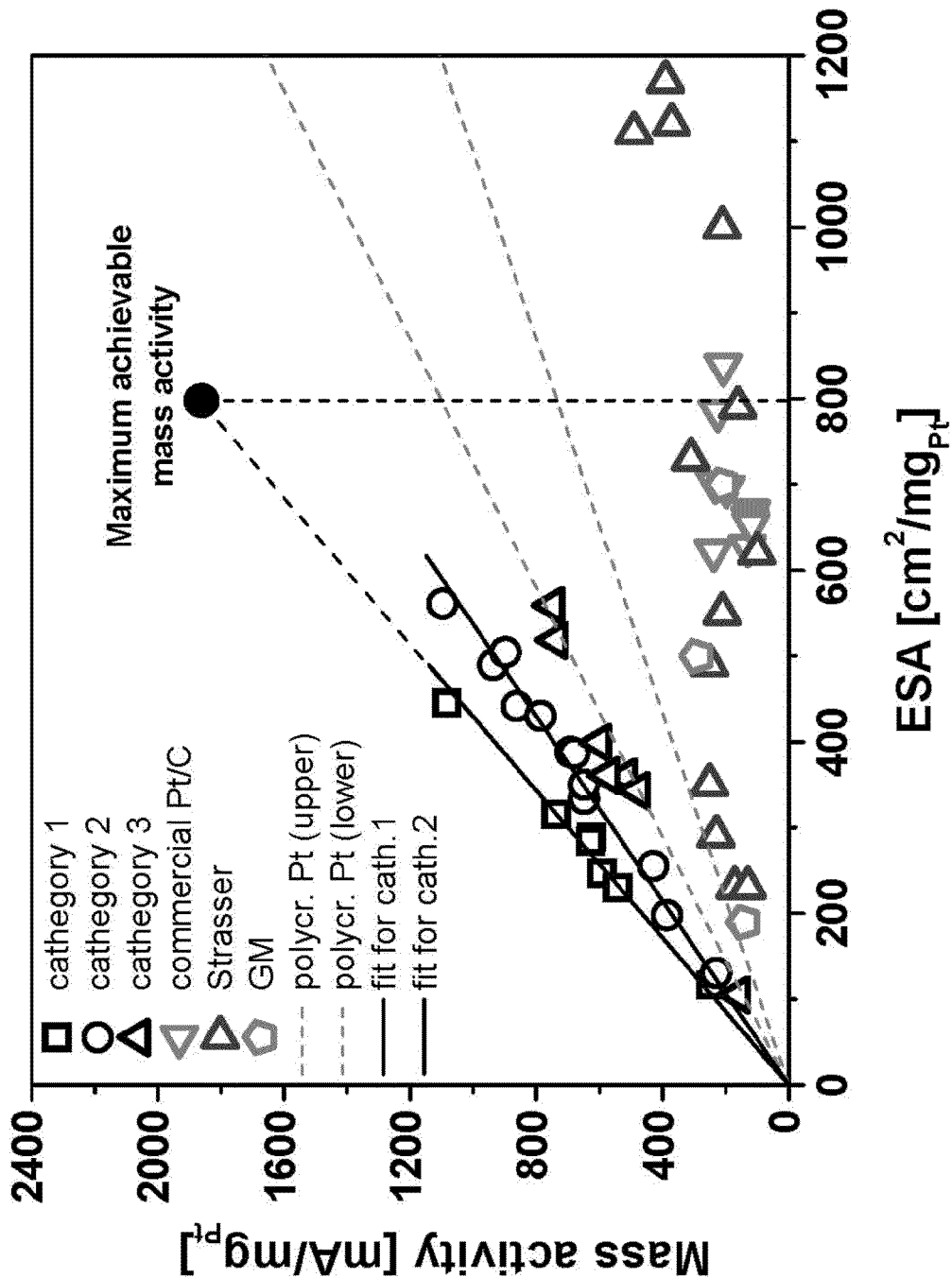
FIG. 10 shows the mass activity ($j_m$) plotted as a function of electrochemically active surface area ($ESA_{H_{UPD}}$), where the slope of each line is the specific catalyst activity ($j_k$) of each distinct composition and/or each distinct composite and the maximum attainable mass activity ($j_m$) is represented by the blue line for a number of compositions and/or composites according to aspects of embodiments and/or embodiments of the present invention.
Figure 11:
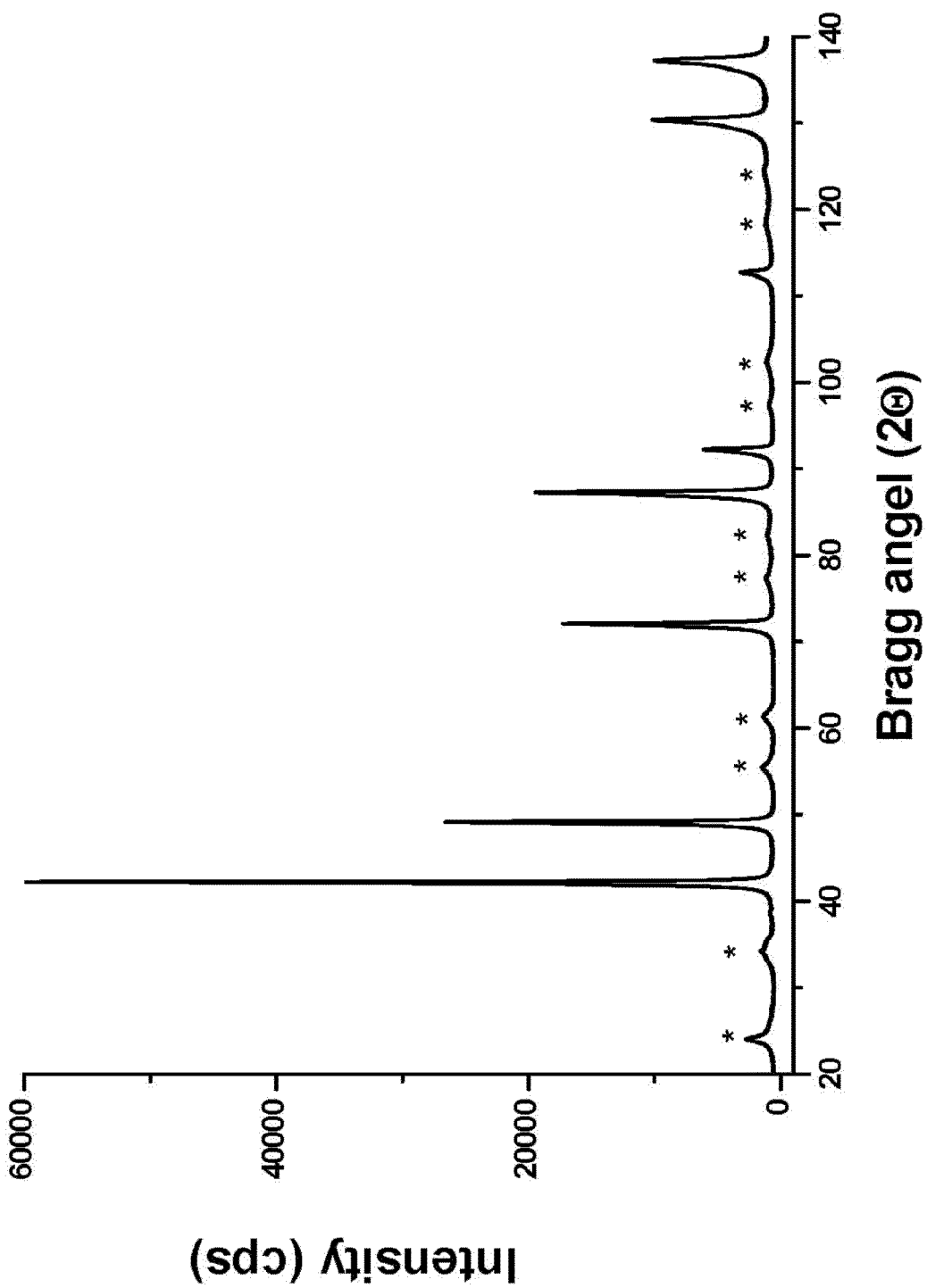
FIG. 11 shows X-ray diffraction patterns of catalyst at final stage of a synthesis process as described in Example A.

Referring now to the drawings in general and FIG. 1 in particular, a perspective partial view of a composite 18 is shown in FIG. 1. The composite 18 includes a matrix 16 and a composition 10. In some aspects of embodiments of the present invention, a composition 10 includes nanoparticles and might be described using the following formula:

$$(M_x^1 M_a^2 M_{1-x-a}^3 \ldots M_\beta^n), \text{Formula } 1^0, \text{where,}$$

$M_\beta^n$ represents one or more of the various preselected transition metals (e.g., $M_x^1$, $M_a^2$, $M_{1-x-a}^3$ . . . etc.). In other aspects of embodiments and/or embodiments of the present invention, a composition 10 of nanoparticles might be described using the following formula:
$(M_x^1 M_a^2 M_{1-x-a}^3 \ldots M_\beta^n)$, Formula $1^0$; or $(M_x^1 M_a^2 M_{1-x-a}^3)$, Formula 1; or $(M_x^1 M_{1-x}^2)$, Formula 1'; and include shell 12 and a core 14. In still yet other aspects of embodiments and/or embodiments of the present invention, a composition 10 of nanoparticles might be described using the following formula: 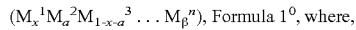 Formula $1^0$; or $(M_x^1 M_a^2 M_{1-x-a}^3)$, Formula 1; or $(M_x^1 M_{1-x}^2)$, Formula 1'; and be characterized as comprising a non-structured portion (e.g., unarranged $Fm\overline{3}m$ structure) and a structured portion (e.g., arranged {e.g., ordered $Pm\overline{3}m$ or ordered P4/mnc or ordered $P4_2$/mmc or ordered I4/mmm or ordered P4/mmm or ordered P2/m . . . etc.} structure). In some of these aspects, at least a portion of a surface of the nanoparticles including an alloy of $(M_x^1 M_a^2 M_{1-x-a}^3 \ldots M_\beta^n)$, Formula $1^0$; or $(M_x^1 M_a^2 M_{1-x-a}^3$, Formula 1; or $(M_x^1 M_{1-x}^2)$, Formula 1'; has the structured portion (e.g., arranged {e.g., ordered $Pm\overline{3}m$ or ordered P4/mnc or ordered $P4_2$/mmc or ordered I4/mmm or ordered P4/mmm or ordered P2/m . . . etc.} structure). In other of these aspects, a mass fraction of the structured portion (e.g., arranged {e.g., ordered $Pm\overline{3}m$ or ordered P4/mnc or ordered $P4_2$/mmc or ordered I4/mmm or ordered P4/mmm or ordered P2/m . . . etc.} structure) might be an amount from about 0 to about 1.

Description of Composition(s)

A composition according to aspects of embodiments and/or embodiments of the present invention might be described using the following formula:

 Formula $1^0$, where, $M_\beta^n$ represents one or more of the various preselected transition metals (e.g., $M_x^1$, $M_a^2$, $M_{1-x-a}^3$ . . . etc.). According to some aspects of embodiments and/or embodiments of the present invention, if a composition includes a two-component alloy (e.g., $(M_x^1 M_{1-x}^2)$, Formula 1'), then generally one of the two metals in the alloy (e.g., $M_x^1$) is a noble metal in one aspect from Group Ib and/or Group VIII and/or Group VIIa and/or Group VIa and/or Group Va and/or Group IVa of the periodic table of elements while in another aspect from Group VIII and/or Group Ib of the periodic table of elements; and the other of the two in the alloy (e.g., $M_{1-x}^2$) can be a noble metal or a non-noble metal in one aspect from Group Ib and/or Group VIII and/or Group VIIa and/or Group VIa and/or Group Va and/or Group IVa of the periodic table of elements while in another aspect from Group VIII and/or Group Ib of the periodic table of elements. According to some aspects of embodiments and/or embodiments of the present invention, the atomic percent (at %) of the noble metal (e.g., $M_x^1$, might be platinum, palladium . . . etc.) comprises, in one aspect from about 10 to about 90 (atomic faction x=from about 0.1 to about 0.9; in another aspect from about 10 to about 50 (atomic faction x=from about 0.1 to about 0.5); and in still yet another aspect about 10 to about 30 (atomic faction x=from about 0.1 to about 0.3).

According to other aspects of embodiments and/or embodiments of the present invention, if the a composition includes a three-component alloy (e.g., $(M_x^1 M_a^2 M_{1-a-x}^3)$, Formula 1), one of the three metals in the alloy (e.g., $M_x^1$, might be platinum, palladium . . . etc.) is a noble metal in one aspect from Group Ib and/or Group VIII and/or Group VIIa and/or Group VIa and/or Group Va and/or Group IVa of the periodic table of elements while in another aspect from Group VIII and/or Group Ib of the periodic table of elements; the second of the three metals in the alloy (e.g., $M_a^2$) can be either a noble metal or non-noble metal in one aspect from Group Ib and/or Group VIII and/or Group VIIa and/or Group VIa and/or Group Va and/or Group IVa of the periodic table of elements while in another aspect from Group VIII and/or Group Ib of the periodic table of elements; and the third metal the three metals in the alloy (e.g., $M_{1-a-x}^3$) can be either a noble metal or non-noble metal in one aspect from Group Ib and/or Group VIII and/or Group VIIa and/or Group VIa and/or Group Va and/or Group IVa of the periodic table of elements while in another aspect from Group VIII and/or Group Ib of the periodic table of elements.

According to other aspects of embodiments and/or embodiments, a composition can include a total atomic percent (at %) of noble metals (e.g., $M_x^1$, or $M_x^1+M_a^2+$, or $M_x^1+M_{1-a-x}^3$ ... etc.) in one aspect from about 10 to about 90 (atomic faction of either x or x+a or x+(1-x-a) ... etc. =from about 0.1 to about 0.9 and in another aspect from about 10 to about 50 (atomic faction of either x or x+a or x+(1-x-a) ... etc.=from about 0.1 to about 0.5).

According to yet other aspects of embodiments and/or embodiments of the present invention, a composition of either a two-component ($M_x^1M_{1-x}^2$) alloy, Formula 1', and/or three-component ($M_x^1M_a^2M_{1-x-a}^3$) alloy, Formula 1, of noble transition metal(s) and non-noble transition metal(s), such alloy might include one or more structured portions and/or one or more non-structured portions. Such one or more structured portions and/or one or more non-structured portions might be at any one of a surface, a shell, a surface of a shell ... etc. For example, according to some aspects of embodiments and/or embodiments of the present invention, one of more structured portions might include platinum (Pt) and/or another noble metal configured to include a d-band electron structure so as to create a lower activation energy for the rate acting elementary reaction stage in an electrocatalytic process of any one or more of an oxygen reduction reaction (ORR), carbon monoxide oxidation reaction (COOR), and methanol oxidation reaction (MOR), optionally, in an acidic electrolyte. To that end, a composition or compositions of ($Pt_xM_a^2M_{1-x-a}^3$)-alloy(s) according to aspects of embodiments and/or embodiments might exhibit an IR-corrected specific catalyst activity ($j_k$, IR-corrected) of about 0.8 mA/cm² or more. Characteristic of a composition or compositions according to other aspects of embodiments and/or embodiments for a carbon monoxide oxidation reaction (COOR) and/or methanol oxidation reaction (MOR), optionally in an acidic electrolyte, might be at least equal to or better than the properties summarized in FIG. 12.

Applicants note that Group 4 elements of the new IUPAC periodic table numbering notation correspond to Group IVa elements of the old IUPAC (European) periodic table numbering notations; Group 5 elements of the new IUPAC periodic table numbering notation correspond to Group Va elements of the old IUPAC (European) periodic table numbering notations; Group 6 elements of the new IUPAC periodic table numbering notation correspond to Group VIa elements of the old IUPAC (European) periodic table numbering notations; Group 7 elements of the new IUPAC periodic table numbering notation correspond to Group VIIa elements of the old IUPAC (European) periodic table numbering notations; Group 8, 9, and 10 elements of the new IUPAC periodic table numbering notation correspond to Group VIII elements of the old IUPAC (European) periodic table numbering notations and the Group 11 elements of the new IUPAC periodic table numbering notation correspond to Group Ib elements of the old IUPAC (European) periodic table numbering notation. To that end, Applicants direct the reader to IUPAC Periodic Table of the Elements dated 23 Aug. 2007 at http://old.iupac.org/reports/periodic_table/IUPAC_Periodic_Table-23Aug.07.pdf for new IUPAC periodic table numbering notation and, for example, to http://en.wikipedia.org/wiki/Group_(periodic_table) and/or Fluck, E. *New notations in the periodic table*. Pure & App. Chem. 1988, 60, pp. 431-436 at http://www.iupac.org/publications/pac/1988/pdf/6003x0431.pdf for the old IUPAC (European) periodic table numbering notations that is also known as the H.G. Deming systems. Thus for example, Group VIII elements (Group 8, 9, and 10 elements) and/or Group Ib elements (Group 11 elements) include one or more of iron (Fe), ruthenium (Ru), osmium (Os), hassium (Hs), cobalt (Co), rhodium (Rh), iridium (Ir), meitnerium (Mt), nickel (Ni), palladium (Pd), platinum (Pt), darmstadtium (Ds), copper (Cu), silver (Ag), gold (Au), and Roentgenium (Rg).

According to some aspects of embodiments or embodiments of the present invention, the noble transition metals and/or non-noble transition metals in the composite comprise any one of in one aspect a metal from Group Ib and/or Group VIII and/or Group VIIa and/or Group VIa and/or Group Va and/or Group IVa of the periodic table of elements; in another aspect a metal from from Group VIII and/or Group Ib of the periodic table of elements; and in yet another aspect platinum, palladium, ruthenium, copper, nickel, and cobalt.

According to some aspects of embodiment and/or embodiments, nanoparticles having a structured and non-structured surface two-component and/or three-component alloys of noble and non-noble transition metals in the periodic table of elements, the atomic percent of a noble metal below the surface lies on average below about 25 and the atomic percent of the noble metal at the surface alloy lies on average above about 25 ((1-a) below the surface lies on average below about 0.25 and (1-a) of at the surface alloy lies on average above about 0.25). According to other aspects of embodiment and/or embodiments, a noble metal has a changed electronic structure of the d-band in the structured surface alloy in a way to ensure lower activation energy for a quick acting elementary reaction stage in an electrocatalytic process of oxygen reduction reaction (ORR), carbon monoxide oxidation reaction (COOR), methanol oxidation reaction (MOR), or combinations thereof in an acid electrolyte. According to still other aspects of embodiment and/or embodiments, when platinum is used as noble metal, have an IR-corrected specific catalyst activity ($j_k$, IR-corrected) in the electrochemical reaction of oxygen reduction (ORR), said activity being determined by a method of thin-layer rotating disc electrode, can be above about 0.8 mA/cm²$_{ESA}$, an ESA is electrochemically active surface area determined by electric oxidation of adsorbed carbon monoxide (CO) with underpotential deposited hydrogen and mass activity ($j_m$, IR-corrected) can be above about 0.44 A/mg$_{Pt}$.

Description of Composite(s)

A composite or composite material according to aspects of embodiments and/or embodiments of the present invention might be described using the following formula:

$$(M_x^1M_a^2M_{1-x-a}^3 \ldots M_\beta^n)_y/C, \quad \text{Formula } 2^0$$

where, y represents the total weight percent (wt %) of the one or more compositions according to Formula $1^0$ (e.g., ($M_x^1M_a^2M_{1-x-a}^3 \ldots M_\beta^n$)) and C represents one of various preselected electrically conductive supports and/or partially electrically conductive supports, (e.g., in one aspect a, is synthesized by a modified sol-gel method). The notation from the section entitled "Description of Composition(s)" applies in this section entitled "Description of Composite(s)."

According to aspects of embodiments and/or embodiments of the present invention, a composite or composite material including a composition of either a two-component ($M_x^1M_{1-x}^2$)-alloy, Formula 1', and/or three-component ($M_x^1M_a^2M_{1-x-a}^3$)-alloy, Formula 1, of one or more noble transition metals and of one or more non-noble transition metals might include one of more structured portions and/or one of more non-structured portions. Such one of more structured portions and/or one of more non-structured portions might be at any one of a surface, a shell, a surface of a shell ... etc. For example, according to some aspects of embodiments and/or embodiments of the present invention, one of more structured portions might include platinum (Pt) and/or another noble metal configured to include a d-band electron structure so as to create a lower activation energy for the rate acting elementary reaction stage in an electrocatalytic process of any one or more of an oxygen reduction reaction (ORR), carbon monoxide oxidation reaction (COOR), and methanol oxidation reaction (MOR), optionally, in an acidic electrolyte. To that end, a composite or composites including a composition or compositions of $(Pt_xM_a^2M_{1-x-a}^3)$-alloy(s) according to aspects of embodiments and/or embodiments might exhibit an IR-corrected specific catalyst activity ($j_k$, IR-corrected) of about 0.8 mA/cm$^2$ or more. Characteristic of a composite or composites according to other aspects of embodiments and/or embodiments for a carbon monoxide oxidation reaction (COOR) and/or methanol oxidation reaction (MOR), optionally in an acidic electrolyte, might be at least equal to or better than the properties summarized in FIG. 12.

Synthesis of Materials

A synthesis of new electrocatalysts is generally based on several stages, for example, on four stages. In a first stage a salt from the salts of non-noble transition metals, polyelectrolytes, surfactants, and activated carbon or graphitized carbon . . . etc. is prepared. After the mixture gels, the obtained gel is left to dry in order to obtain xerogel. The second stage comprises pyrolysis of the prepared xerogel in a reduction or inert atmosphere, in which dispersed nanoparticles of non-noble transition metals are prepared on activated carbon or graphitized carbon . . . etc. The third stage comprises platinization or palladization of dispersed nanoparticles of non-noble metals on activated carbon or graphitized carbon . . . etc. In this case, they are immersed in a solution M(II) of salt (M=Pd and/or Ru and/or Pt) and homogenized with ultrasound and stirring. Due to a different position of non-noble metals and platinum in the electrochemical series, the platinum in this method reduces down to elementary platinum. The fourth stage comprises a method of hardening and tempering in reduction or inert atmosphere, which leads to the appearance of superficially structured nanoparticles of alloys of non-noble transition metals and platinum on activated carbon or graphitized carbon . . . etc.

The first three stages may also be merged, namely all reactants can be added in the first stage and the dried mixture (xerogel) heat treated as described in the fourth stage.

The new method of synthesis of electrocatalysts allows equilibration of chemical potentials on the surface of nanoparticles of alloys dispersed on a substrate in a way that superstructures are formed on the surface of crystalline nanoparticles of alloys. The superstructures stabilize the nanoparticles on the substrate and they thus become electrochemically more active and stable than the currently known electrocatalysts.

The method is based on one or more M(II) based salts (e.g., M=Cu, Co, Ni, Fe, Pd, Ru, Pt . . . etc.), one or more active carbon sources (e.g., carbon, a material pyrolyzable to carbon {e.g., a glucose, starch, biomass . . . etc.} . . . etc.), one or more polyelectrolytes, and one or more surfactants. A composite can be prepared in four stages:

a) First stage. First, a homogeneous mixture of reactants is prepared, wherein polyelectrolytes and surfactants are used to form a viscous sol- or hard gel, which is then dried (xerogel is obtained).

b) Second stage. This stage comprises »in situ« formation of a composite of porous carbon matrix and nanoparticles including a metal or alloy (e.g., Cu and/or Ni and/or Fe and/or Co) from a homogenous mixture of reactants with heat treatment under controlled conditions, like atmosphere, heating and cooling rates, temperature and treatment time. Having been subjected to heat treatment the composite is ground. The composite thus obtained contains metallic nanoparticles (metal and/or alloy=Cu and/or Ni and/or Fe and/or Co) equally distributed and embedded in the porous carbon matrix.

c) Third stage. This stage comprises copperization and/or ruthenization and/or palladization and/or platinization of a composite of a porous carbon matrix and nanoparticles of a metal and/or alloys. A solution of M(II) salt (M=Cu and/or Ru and/or Pd and/or Pt) is prepared to this purpose, to which composite particles obtained in the second stage are added. The mixture thus obtained is homogenized by ultrasound or stirring up to 12 h. After copperization and/or ruthenization and/or palladization and/or platinization the obtained solid part of the mixture is separated from liquid and washed with water and/or organic solvents.

d) Fourth stage. This stage comprises a method of hardening and tempering in reduction or inert atmosphere under controlled conditions, which are normal for the formation of alloys from the mentioned metals (heating and cooling rate, temperature and treatment time). Final composite material is obtained. The composite material can include an activated carbon matrix or graphitized carbon . . . etc. and nanoparticles including platinum alloys of non-noble transition metals having on one or more structured portions, optionally, at or on one or more surfaces of one or more nanoparticles. The composite material of a porous carbon matrix and nanoparticles of alloys (metal=Fe and/or Cu and/or Co and/or Ni and/or Ru and/or Pd and/or Pt or other combinations elements) and, optionally, such nanoparticles characterized by any one or more of being substantially equally distributed throughout the matrix; being substantially of a preselected composition; being substantially of a preselected size or preselected size distribution; having substantially a preselected concentration distribution of elements throughout an individual nanoparticle; having substantially a preselected structure and/or preselected structures and/or distribution of preselected structures throughout an individual nanoparticle; or combinations thereof.

Some aspects of embodiments and/or some embodiments of the present invention include one or more processes, each configured for providing a composite of a carbon matrix and nanoparticles including or more alloys. Other aspects of embodiments and/or other embodiments of the present invention include any one of a control of nanoparticle size; a control of nanoparticle composition; a control of alloy distribution (or alloy partitioning) within a nanoparticle; a control of alloying element distribution (or alloying element partitioning) throughout a nanoparticle; a control of crystal structure distribution (or alloying element partitioning) throughout a nanoparticle; a control of electron distribution throughout a nanoparticle; a control of porosity within a matrix; a control of nanoparticle distribution throughout a matrix; and combinations thereof.

Description of Process(es)

A composite material with formula $(M_x^1M_a^2M_{1-a-x}^3 \ldots M_\beta^n)_y/C$, Formula 2$^0$, comprising y wt % of all metals $M_x^1 + M_a^2 + M_{1-a-x}^3 + \ldots M_\beta^n$, wherein symbols $M_\beta^n$ represent various transition metals and C represents one of various preselected electrically conductive supports and/or partially electrically conductive supports, (e.g., in one aspect a, is synthesized by a modified sol-gel method). If the alloy is a two-component alloy, two-component $(M_x^1M_{1-x}^2)$-alloy, Formula 1, then generally one of the two metals in the alloy (e.g., $M_x^1$) is a noble metal from in one aspect Group Ib and/or Group VIII and/or Group VIIa and/or Group VIa and/or Group Va and/or Group IVa of the periodic table of elements while in another aspect from Group VIII and/or Group Ib of the periodic table of elements; and the other of the two metals in the alloy (e.g., $M_{1-x}^2$) can be a noble metal or a non-noble metal from in one aspect Group Ib and/or Group VIII and/or Group VIIa and/or Group VIa and/or Group Va and/or Group IVa of the periodic table of elements while in another aspect from Group VIII and/or Group Ib of the periodic table of elements. The atomic percent of the first noble metal (e.g., $M_x^1$, normally platinum) can amount to in one aspect from about 10 to about 90 (atomic faction either x=from about 0.1 to about 0.9; in another aspect from about 10 to about 50 (atomic faction x=from about 0.1 to about 0.5); and in still yet another aspect from about 10 to about 30 (x=from about 0.1 to about 0.3). If the alloy is a three-component ($M_x^1 M_a^2 M_{1-x-a}^3$)-alloy, Formula 1, one of the metals in the alloy (e.g., $M_x^1$) is a noble metal from in one aspect Group Ib and/or Group VIII and/or Group VIIa and/or Group VIa and/or Group Va and/or Group IVa of the periodic table of elements while in another aspect from Group VIII and/or Group Ib of the periodic table of elements, the second and third metals in the alloy (e.g., $M_a^2$ and $M_{1-a-x}^3$) can be noble or non-noble metals from in one aspect Group Ib and/or Group VIII and/or Group VIIa and/or Group VIa and/or Group Va and/or Group IVa of the periodic table of elements while in another aspect from Group VIII and/or Group Ib of the periodic table of elements, wherein the sum of atomic percents of all noble metals in the alloy lies in a range in one aspect from about 10 to about 90 (atomic faction either x or x+a or x+(1-x-a) . . . etc.=from about 0.1 to about 0.9); in another aspect from about 10 to about 50 (x=from about 0.1 to about 0.5); and in still yet another aspect from about 10 to about 30 (x=from about 0.1 to about 0.3). The composition including two-component alloys and/or three-component alloys of one or more noble and one or more non-noble transition metals can include one or more structured portions and one or more non-structured portions. Such one or more structured portions can be at or near one or more surfaces of one or more nanoparticle. Platinum or another noble metal has a changed electron structure of the d-band in the structured surface alloy in a way to ensure lower activation energy for the rate acting elementary reaction stage in an electrocatalytic process of oxygen reduction, carbon monoxide oxidation and methanol oxidation in an acidic electrolyte. According to some aspect of embodiments and/or embodiments, a composite material including one or more (Pt-M) alloys exhibit a IR-corrected specific catalyst activity ($j_k$, IR-corrected) in excess of about 0.8 mA/cm$^2$. Properties of carbon monoxide oxidation and methanol oxidation in an acidic electrolyte are at least equal or better than the properties indicated in FIG. 12.

A weight percentage (y, wt %) of metals in a composite can be about 50 or less. Some examples of metals in a composite, without limitation, include platinum, palladium, ruthenium, copper, nickel, cobalt, one or more alloys thereof, or combinations thereof.

The method of preparation of embedded nanoparticles of alloys in a porous carbon matrix for electrocatalysis by a modified sol-gel method derives from M(II) or salt (M=Cu and/or Ni and/or Fe and/or Co and/or Ru and/or Pd and/or Pt and/or Pt and Ru or other combinations of elements), a polyelectrolyte (ethyl cellulose, gelatine, guar gum, hydroxiethylcellulose, hydroximethylcellulose, hydroxypropyl starch, maltodextrin, methyl cellulose, polydextrose, succhrose, tragacant, xantan gum . . . etc.), surfactants (hexadecyl triammonium bromide, decyl trimethyl ammonium bromide, cetyl trimethyl ammonium bromide, dodecyl ammonium chloride, cetylpyridinium chloride . . . etc.), carbon (in the form of graphite, carbon black, nanotube . . . etc.) and if needed additives (like glucose, starch, biomass) which form carbon compounds in pyrolysis. The final material for electrocatalysis is prepared in four stages:

First stage: A homogenous mixture of reactants is first prepared. While stirring 0.01-20 g of polyelectrolyte, 0.01-20 g of surfactant and 0.1-20 g M(II) of salt (M=Cu and/or Co and/or Ni and/or Fe)) in 150-200 g of water are dissolved and if needed 0.1-10 g of carbon and/or 0.1-20 g of additives are added, which form carbon compounds in pyrolysis. If needed, the mixture thus obtained is additionally homogenized by using turbo stirrers and/or ultrasound and/or homogenization mills. If needed, the homogeneous mixture can be dried prior to heating.

Second stage: A composite of a porous carbon matrix and nanoparticles (metal or alloy=Cu and/or Ni and/or Fe and/or Co) is prepared <<in situ>> from a homogenous mixture of reactants. The homogenous mixture of reactants is heated with a heating rate 0.1-20° C./min to 250° C.-1500° C. in an inert or reduction atmosphere for 0.1-10 h. The composite is ground after being subjected to heat treatment. The resultant composite includes a porous carbon matrix and nanoparticles of one or more metals (metal and/or alloy=Cu and/or Ni and/or Fe and/or Co) that, in some aspects of embodiments and/or some embodiments, might be substantially equally distributed throughout the porous carbon matrix.

Third stage: The composite of a carbon matrix and nanoparticles including a metal and/or alloy is palladiumized and/or platinized and/or ruthenized. To this purpose 0.1-15 g M(II) of salt (M=Pd and/or Pt or Ru and/or Pt) is dissolved in 20-100 mL of water while stirring and 0.1-2 g of particles of previously formed composite is added. The mixture thus obtained is then homogenized while stirring up to 12 h. If needed, ultrasound is used in homogenization. After palladization ruthenization and/or and/or platinization the solid part is separated from the liquid and washed several times with water and/or organic solvents if needed and dried.

Fourth stage: The final composite material is obtained with heat treatment of the product after palladization and/or platinization by heating it at a rate 0.1-20° C./min to a temperature of 250° C. to 1500° C. in an inert or reduction atmosphere for 0.1-10 h. After heating, the sample is cooled to room temperature at a cooling rate 0.1-20° C./min. If needed, the sample is additionally heat treated before or after heating at a temperature of 250-400° C. for 1-60 min in oxidative atmosphere in order to remove part of pyrolytic carbon, which resulted from polyelectrolytes and/or surfactants and/or additives, which form carbon in pyrolysis. If increased ordering of the alloy is desired, the sample is subjected to an additional tempering at a temperature range from about 250° C. to about 600° C. for time range from about 1 h to about 2 weeks in a reducing atmosphere or inert atmosphere as might be appropriate. The product contains nanoparticles of alloys (metal=Cu and/or Fe and/or Co and/or Ni and/or Pd and/or Ru), which are equally distributed and embedded in porous carbon matrix with controlled composition and size of nanoparticles and even with controlled concentration distribution of elements and crystal structure of an individual nanoparticle.

The obtained material is characterized by superficially structured nanoparticles of the alloy on activated carbon where the nanoparticles can exhibit a structured portion (e.g., arranged or ordered with a Pm3̄m structure (marking Strukturbericht $L1_2$)) and/or a non-structured portion (e.g., unarranged or disordered Fm3̄m structure). According to some other aspects, superficially structured nanoparticles can include a core of a structured portion or semi-structured portion (e.g., a crystalline alloy including atoms of two or more metals randomly distributed in a cubic Fm-3m structure) while the shell can include a structured portion (e.g., atoms of two or more metals order in an alternating manner in cubic Pm$\bar{3}$m structure or tetragonal and orthorhombic arrangements (e.g. P4/mnc structure, P4$_2$/mmc structure, I4/mmm structure, P4/mmm structure, P2/m structure ... etc.) ... etc.). It is desirable that the space distribution of both structures in the alloy provides for an IR-corrected specific catalyst activity ($j_k$, IR-corrected) in excess of about 0.8 mA/cm$^2$ and that the properties of carbon monoxide oxidation and methanol oxidation in an acidic electrolyte are at least equal or better than the properties indicated in FIG. 12.

The obtained composite material of a composition of nanoparticles can be used in an electrochemical oxygen reduction reaction (ORR), in an electrochemical hydrogen oxidation reaction (HOR) in the presence of carbon monoxide at concentrations of the latter exceeding about 10 ppm and/or in an electrochemical methanol oxidation reaction (MOR). It might be used as part or all of one or more of a cathodic electrode(s) side and/or as part or all of an anodic electrode(s) side of a fuel cell, optionally, including one or more proton conducting membrane(s) (PCM).

The obtained material is combined with an adequate binder (e.g., PTFE dispersion, such as for example a NAFION® dispersion) and one or more preselected electrically conductive supports and/or partially electrically conductive supports (e.g., carbon black, graphite, metallic parts, electronically conducting polymer) and thus becomes suitable for electrocatalytic tests or can be used as an electrocatalytically active component in fuel cells.

Parameters Describing Activity of Electrocatalysts

Some parameters used to describe the activity of electrocatalysts in a fuel cell follow.

"Electrochemically active Surface Area" (ESA) of the catalyst is given by:

$$ESA = \frac{S}{m}; \quad \left[\frac{m^2}{g_k}\right], \quad \text{Equation 1,}$$

where:

S is the real surface area (e.g., meters squared [m$^2$]) and m is the mass (e.g., grams [g]) of the catalytically active component of a composition and/or composite such as, for example, a noble transition metal (k).

"Specific catalyst activity" ($j_k$) is given by:

$$j_k = \frac{i_{k,IR-corrected}}{S}; \quad \left[\frac{mA}{cm^2}\right], \quad \text{Equation 2,}$$

where:

$i_{k, IR-corrected}$ is the IR-corrected kinetic current (milliamperes [mA]) resulting from electrochemical reaction under specified conditions and S is the real surface area (e.g., centimeters squared [cm$^2$]) of the catalytically active component of the compositions and/or composite, for example a noble transition metal (k).

"Catalyst mass activity" ($j_m$) is given by:

$$j_m = \frac{i_k}{m_{PK}}; \quad \left[\frac{A}{mg_{PK}}\right], \quad \text{Equation 3,}$$

where:

$i_{k, IR-corrected}$ is the IR-corrected kinetic current resulting from electrochemical reaction under specified conditions and m is the mass (e.g., milligrams [mg]) of the catalytically active component of a composition and/or composite such as, for example, a noble transition metal (k).

It results from Equations 1, 2 and 3 that the mass activity ($j_m$) is a product of specific catalyst activity ($j_k$) and electrochemically active surface area (ESA) of a catalyst:

$$j_m = j_k \times ESA, \quad \text{Equation 4}$$

The electrochemically active surface area (ESA) of a catalyst might be manipulated in three ways:

Characterization of Composition(s) and/or Composite(s)

Parameters for describing the catalytic activity of composition(s) and/or composite(s) according to aspects of embodiments and/or embodiments of the present invention and commercially available catalysts was determined by conventional methods described H. A. Gasteiger, S. S. K° Cha, B. Sompalli, and F. T. Wagner, *Activity benchmarks and requirements for Pt, Pt-alloy, and non-Pt oxygen reduction catalysts for PEMFCs*, Appl. Catal. B: Environ., (2005) vol. 56, n° 1-2, pp. 9-35, (herein after H. A. Gasteiger et al.). The activity of catalysts was determined using a rotating disc electrode method in a thermostated three-chamber electrochemical cell having a 50 milliliters (mL) volume. Equipment and supplies included:

a glassy carbon disc electrode having a surface area of 0.196 cm$^2$ and commercially available from Pine Research Instrumentation, Inc. (Raleigh, N.C., US);

a model PARSTAT 2273 potentiostat commercially available from Princeton Applied Research (Oak Ridge, Tenn., US);

a revolution regulator MSRX Speed Control commercially available from Pine Research Instrumentation, Inc. (Raleigh, N.C., US);

a reference silver/silver chloride (calomel) electrode (SSCE electrode) commercially available from BASi (Bioanalytical Systems, Inc.) headquartered in West Lafayette, Ind., US connected with a measuring cell via an electrolytic key and having a platinum wire counter electrode, a 0.1 M perchloric acid solution (70%, pro analysi, Merck) carrying electrolyte prepared using water deionized through the Milli-Q filter commercially available from Millipore Corporation headquartered in Billerica, Mass., US; and a reference hydrogen electrode (RHE electrode) having a platinum disc electrode commercially available from Pine Research Instrumentation, Inc. with a surface 0.196 cm$^2$ immersed in 0.1 M perchloric acid saturated with hydrogen (Hydrogen 5.0 comprising 99.999 hydrogen commercially available from Messer Slovenija d.o.o., Ruše, Slovenia).

A difference in the potential between the reference SSCE electrode and the RHE electrode was determined with measurements at 1600 revolutions per minute and an opened element. The difference in the potential between the RHE electrode with respect to the SSCE electrode was 270 mV.

Activities of catalysts were determined by a thin film method (TF-RDE) in a way that 20 microliters (µL) of a 1 mg/mL catalyst-water suspension from a catalyst supported on a substrate (e.g., activated carbon, graphitized carbon . . . etc.) was applied on a polished surface of a glassy carbon disc. The suspension was dried in flowing nitrogen (Nitrogen 5.0 that comprises 99.999 nitrogen commercially available from Messer Slovenija d.o.o., Ruše, Slovenia) at about room temperature. A platinum coating of about 20 micrograms per square centimeter ($\mu gPt/cm^2$) was deposited on the electrode for the catalysts containing platinum alloys (e.g., PtCu/C and PtRu/C) while a coating of about 30 $\mu gPt/cm^2$ was deposited for the catalysts containing pure platinum (Pt/C). To obtain better contact of the catalyst with the glassy carbon, 3 $\mu L$, of a solution of NAFION® PFSA polymer dispersions (5 wt %, FLUKA brand and now Sigma-Aldrich Chemie GmbH, Switzerland) diluted with isopropyl alcohol in a ratio 1:50 was pipetted to a disc after drying. The latter covers the applied catalyst with a thin film and prevents loss of catalyst particles while the electrode rotates at high revolutions.

The behavior of catalysts was first tested using cyclic voltammetry (CV), with 90 cycles in the area of potentials between 0.07 and 1.17 V with respect to the reference hydrogen electrode (RHE) until a stable cyclic voltammogram was measured, the characteristics of which did not change in further cycling. The activity of catalysts in reactions of oxygen reduction and hydrogen oxidation were determined at 1600 rev/min at 25° C. in a solution of substrate electrolyte (0.1 M solution of perchloric acid) saturated with hydrogen (Hydrogen 5.0 comprising 99.999 hydrogen commercially available from Messer Slovenija d.o.o., Ruše, Slovenia) with potential flow 20 millivolts per second (mV/s) in the same area of potentials. The electrochemically active surface area (ESA) of catalysts was determined with CO stripping voltametry and application of underpotential deposited hydrogen ($H_{UPD}$), which is sometimes designated ($ESA_{H_{UPD}}$). Finally, the activity in a methanol oxidation reaction (MOR) was determined: to a substrate electrolyte methanol (1 M $HClO_4$+1 M $CH_3OH$) was added and the activity of the catalyst was measured with an application of 17.3 [$g/cm^2$ after 30 cycles of the catalyst with potential flow 50 mV/s. A correction due to uncompensated ohmic resistance (about 20-25 Ohm) was carried out subsequently. A decrease in voltage due to ohmic resistance between the reference and working electrode was determined by impedance measurement at 0.35 V vs. RHE at room temperature (amplitude 0.01 V frequency range 1 Hz to 10 kHz).

X-ray Photoelectron Spectroscopy (XPS also known as Electron Spectroscopy for Chemical Analysis (ESCA)) was used to examine the surface of catalysts that had been formed into self-carrying tablets. XPS analysis of samples was performed using a model PHI TFA XPS spectrometer commercially available from Physical Electronics, Inc., Chanhassen, Minn., US. The diameter of the analysis spot was about 0.4 millimeter (mm). X-rays from a monochromatic Al Ka (having an energy of 1486.7 eV) source were used for excitation. The analysis depth amounted to a few nanometers (nm). Photoelectrons were analyzed by a hemispheric analyzer positioned at an angle of 45° with respect to the normal of the sample surface. Energy resolution of the instrument was about 0.5 eV.

An overview spectrum of the surface was recorded in the 0-1200 eV range using a 0.4 eV step and electron transition energy of 187.85 eV. An overview spectrum was used to calculate surface composition. High definition spectra C 1s, Cu 2p, Pt 4f, and Pd 3d were recorded using a 0.125 eV step and electron transition energy of 29.35 eV.

The energy scale was calibrated with respect to carbon spectrum, to which 284.5 eV were attributed, the typical value for graphite.

EXAMPLES

The examples described in the continuation are merely explicative and in no way whatsoever limit the scope of the invention merely to these examples.

Example A (CPC35A1PtZ) This Example A relates to a process for a preparation of a composite material of (1) a porous carbon matrix and (2) a composition of nanoparticles including copper and platinum. As described above, the process comprises four (4) stages.

First stage: A mixture of ingredients is prepared by sequentially adding to about 200 mL of water at about 60° C. while stirring:
  from about 5 grams (g) to about 15 g of gelatin GELATIN-B; FLUKA brand and now Sigma-Aldrich Chemie GmbH, Switzerland, cat. No. 48722);
  from about 0.5 g to about 2 g of cetyl-trimethyl-ammonium bromide (CTAB-FLUKA brand and now Sigma-Aldrich Chemie GmbH, Switzerland, cat. No. 52365);
  from about 5 g to about 20 g of copper acetate (FLUKA brand and now Sigma-Aldrich Chemie GmbH, Switzerland, cat. No. 61145); and
  from about 2 g to about 10 g of carbon black (VULCAN® XC72R carbon black, Cabot Corporation headquartered in Boston, Mass., US).
The mixture is homogenized while stirring for from about 5 minutes (min) to about 20 min and then using a turbo stirrer Ultra Turax (from about 11000 rpm to about 24000 rpm) from about 5 min to about 10 min. After homogenization, the mixture is cooled to about room temperature and left for about 12 hour (h) resulting in a gel. The resultant gel is frozen using liquid nitrogen and dried under vacuum resulting in a freeze-dried gel.

Second stage: A composite of a porous carbon matrix and nanoparticles including copper is prepared "in situ" from the freeze-dried gel of the First Stage. About 2 g of the freeze-dried gel of the First Stage is placed into a controlled atmosphere oven having reducing argon (Ar)-hydrogen (H2) atmosphere (comprising about 5 volume percent [vol %] $H_2$) flow at a rate of about 50 milliliter per minute (mL/min). The oven is heated at a rate of from about 2 degrees Celsius per minute (° C./min) to about 20° C./min to from about 500° C. to about 900° C. for from about 0.1 h to about 5 h and cooled at a rate from about 2° C./min to about 10° C./min to about room temperature resulting in a composite.

Third stage: A composite of a porous carbon matrix and nanoparticles including copper of the Second Stage is platinized (covered, treated, and/or combine with platinum or a compound of platinum). The resultant composite of the Second Stage is ground. A mixture of ingredients is prepared by sequentially adding to about form about 20 mL to about 30 mL of water while stirring:
  from about 0.2 g to about 0.3 g of potassium tetrachloroplatinate (ALDRICH brand and now Sigma-Aldrich Chemie GmbH, Switzerland, cat. No. 323411); and
  from about 0.2 g to about 0.5 g of the ground resultant composite of the Second Stage.
The mixture is homogenized using an ultrasonic bath and then under continuous stirring for about 12 h to effect platinization. Then, the solid portion of the mixture is separated from the liquid, washed three (3)-times with ethanol, and dried resulting in a composite of a porous carbon matrix and platinized nanoparticles including copper.

Fourth stage: A composite of a porous carbon matrix and platinized nanoparticles including copper of the Third Stage is heat treated to effect alloying of platinum and copper. The resultant composite of Stage 3 is heat treated in a controlled atmosphere oven at (a) first preselected temperature in (i) an air atmosphere and, then, (ii) a reducing atmosphere; and, then, (b) a second preselected temperature in a reducing atmosphere.

(a) After placing the resultant composite of Stage 3 into a controlled atmosphere oven while maintaining an air atmosphere, the oven is heated at a rate of about 5° C./min to a first preselected temperature (from about 250° C. to about 400° C.) and then held at this preselected temperature for about 1 h. After from about 5 min to about 15 min of the oven reaching the first preselected temperature (from about 250° C. to about 400° C.), the atmosphere in the oven is changed:
  (i) first the controlled atmosphere oven is flushed using argon flowing at a rate of about 100 mL/min for about 15 min and, then,
  (ii) the atmosphere of the oven is change to a reducing Ar—$H_2$ gas mixture (comprising about 5 vol % $H_2$) flowing at a rate of about 100 milliliter per minute (mL/min) through the end of the heat treatment at the first preselected temperature (from about 250° C. to about 400° C.).
(b) After about 1 h at the first preselected temperature (from about 250° C. to about 400° C.), the oven is heated at a rate of from about 2° C./min to about 20° C./min to a second preselected temperature (from about 600° C. to about 1200° C.) for from about 0.1 h to about 10 h.

After completion of the heat treatment at the second preselected temperature (from about 600° C. to about 1200° C.), the oven is cooled to about room temperature at a rate of from about 0.1° C./min to about 100° C./min followed by flushing the oven chamber using argon flowing at a rate of about 100 mL/min for about 15 min.

The heat-treated composite of this Example A includes a porous carbon matrix and nanoparticles including a platinum-copper alloy coated copper (e.g., a platinum-copper alloy shell on a copper core). The platinum-copper alloy shell on the copper core is characterized as comprising a non-structured portion (e.g., unarranged Fm$\bar{3}$m structure) and a structured portion (e.g., arranged Pm$\bar{3}$m structure).

A shell on the surface of each copper core includes the structured portion (e.g., arranged Pm$\bar{3}$m structure). In aspects of embodiments and/or embodiments of the present invention, a mass fraction of the structured portion (e.g., arranged Pm$\bar{3}$m structure) might comprise an amount from about 0 to about 1.

Example B (CPC33APtS) This Example B relates to a process for a preparation of a composite material of (1) a porous carbon matrix and (2) a composition of nanoparticles including nickel and platinum. As described above, the process might include four (4) stages.

The process of Example B is substantially that of Example A except that in the First Stage nickel acetate tetrahydrate (FLUKA brand and now Sigma-Aldrich Chemie GmbH, Switzerland, cat. No. 72225) is used instead of copper acetate monohydrate in the preparation of the freeze-dried gel.

The heat-treated composite of this Example B includes a porous carbon matrix and nanoparticles including a platinum-nickel alloy coated nickel (e.g., a platinum-nickel alloy shell on a nickel core) and. The platinum-nickel alloy shell on the nickel core is characterized as comprising a non-structured portion (e.g., unarranged Fm$\bar{3}$m structure) and a structured portion (e.g., arranged Pm$\bar{3}$m structure or P4/mmm structure . . . etc.).

A shell surroundings of each nickel core comprises the structured portion (e.g., arranged Pm$\bar{3}$m structure). In aspects of embodiments and/or embodiments of the present invention, a mass fraction of the structured portion (e.g., arranged Pm$\bar{3}$m structure or P4/mmm structure . . . etc.) might comprise an amount from about 0 to about 1.

Example C (CPC35APdZ) This Example C relates to a process for a preparation of a composite material of (1) a porous carbon matrix and (2) a composition of nanoparticles including copper and palladium. As described above, the process comprises four (4) stages.

The process of Example C substantially comprises that of Example A except that in the Third stage copper palladization (e.g., covering, treating, and/or combining with palladium or a compound of palladium) is used instead of platinization by using palladium chloride instead of potassium tetrachloroplatinate in the preparation of a composite of a porous carbon matrix and palladiumized nanoparticles including copper.

The heat-treated composite of this Example C includes a porous carbon matrix and nanoparticles including a palladium-copper alloy coated copper (e.g., a palladium-copper alloy shell on a copper core). The palladium-copper alloy shell on the copper core is characterized as comprising a non-structured portion (e.g., unarranged Fm$\bar{3}$m structure) and a structured portion (e.g., arranged {e.g., ordered Pm$\bar{3}$m or ordered P4/mnc or ordered P4$_2$/mmc or ordered I4/mmm or ordered P4/mmm or ordered P2/m . . . etc.} structure).

A shell surroundings of each copper core comprises the structured portion (e.g., arranged {e.g., ordered Pm$\bar{3}$m or ordered P4/mnc or ordered P4$_2$/mmc or ordered I4/mmm or ordered P4/mmm or ordered P2/m . . . etc.} structure). In aspects of embodiments and/or embodiments of the present invention, a mass fraction of the structured portion (e.g., arranged {e.g., ordered Pm$\bar{3}$m or ordered P4/mnc or ordered P4$_2$/mmc or ordered I4/mmm or ordered P4/mmm or ordered P2/m . . . etc.} structure) might comprise an amount from about 0 to about 1.

Example D (CPC41CBSPtZ) This Example D relates to a process for a preparation of a composite material of (1) a porous carbon matrix and (2) a composition including nanoparticles comprising nickel, copper, and platinum. As described above, the process comprises four (4) stages which in this Example D includes an additional stage between the Second stage and Third stage comprising a Copperization (covering, treating, and/or combining with copper or a compound of copper) stage that results in a composite of a porous carbon matrix and copperized nanoparticles including nickel.

The process of Example D substantially comprises that of Example B except between the Second stage and Third stage; the Copperization Stage is used resulting in a composite of a porous carbon matrix and copperized nanoparticles including nickel. The details of a use of copper chloride and a heat treatment in the Copperization stage follow.

Copperization stage: A composite of a porous carbon matrix and nanoparticles including nickel of the Second stage is copperized (covered, treated, and/or combine with copper or a compound of copper). The resultant composite of the Second Stage is ground. A mixture of ingredients is prepared by sequentially adding to about 20-30 mL of water while stirring:
  from about 0.1 g to about 0.2 g of copper chloride (FLUKA brand and now Sigma-Aldrich Chemie GmbH, Switzerland, cat. No. 61175) and
  from about 0.2 g to about 0.7 g of the ground resultant composite of the Second Stage.

The mixture is homogenized using an ultrasonic bath and then under continuous stirring for about 12 h to effect copperization. Then, the solid portion of the mixture is separated from the liquid, washed three (3)-times with ethanol, and dried resulting in a composite of a porous carbon matrix and copperized nanoparticles including nickel.

The copperized composite is placed into a controlled atmosphere oven having reducing Ar-$H_2$ mixture (comprising about 5 vol % $H_2$) flowing at a rate of about 50 mL/min. The oven is heated at a rate of from about 2° C./min to about 20° C./min to from about 500° C. to about 900° C. for from about 0.1 h to about 5 h and, then, cooled at a rate of about 1° C./min from about 10° C./min to about room temperature resulting in a composite of a porous carbon matrix and nanoparticles including copper and nickel.

The resultant composite of the Copperization stage is then subjected to substantially the Third stage and Fourth stage of Example A resulting in a composite of a porous carbon matrix and nanoparticles including platinum, copper, and nickel.

The heat-treated composite of this Example D includes a porous carbon matrix and nanoparticles including a platinum-copper alloy coated nickel. The platinum-copper alloy shell on the nickel core is characterized as comprising a non-structured portion (e.g., unarranged $Fm\bar{3}m$ structure) and a structured portion (e.g., arranged $Pm\bar{3}m$ structure).

A shell surroundings of each nickel core comprises the structured portion (e.g., arranged $Pm\bar{3}m$ structure). In aspects of embodiments and/or embodiments of the present invention, a mass fraction of the structured portion (e.g., arranged $Pm\bar{3}m$ structure) might comprise an amount from about 0 to about 1.

Example E (CPC36GPtRuZ) This Example E relates to a process for a preparation of a composite material comprising (1) a porous carbon matrix and (2) a composition of nanoparticles including copper, ruthenium, and platinum. As described above (Example A), the process comprises four (4) stages which in this Example E includes an additional step between the Third stage and Fourth stage comprising a Rutheniumization (covering, treating, and/or combining with ruthenium or a compound of ruthenium) stage that results in a composite of a porous carbon matrix and rutheniumized nanoparticles including platinum and copper.

Rutheniumization stage: A composite of a porous carbon matrix and platinized nanoparticles including copper of the Third stage is rutheniumized (covered, treated, and/or combine with ruthenium or a compound of ruthenium). A mixture of ingredients is prepared by sequentially adding to about 3 mL of acetone while stirring:

from about 0.02 g to about 0.3 g of ruthenium chloride (Acros Organics, Geel, Belgium, cat. No. 195480250) and from about 0.2 g to about 0.5 g of the platinized composite of the Third Stage.

The mixture is homogenized using a mortar and pestle set and then waiting for about 15 min. for the acetone to evaporate to effect rutheniumization.

The resultant composite of the Rutheniumization stage is then subjected to substantially the Fourth stage of Example A resulting in a composite of a porous carbon matrix and nanoparticles including copper, ruthenium, and platinum.

The heat-treated composite of this Example E includes a porous carbon matrix and nanoparticles having a ruthenium-platinum-copper alloy coated copper (e.g., a ruthenium-platinum-copper alloy shell on a copper core). The ruthenium-platinum-copper shell on the copper core is characterized as comprising a non-structured portion (e.g., unarranged $Fm\bar{3}m$ structure) and a structured portion (e.g., arranged $Pm\bar{3}m$ structure).

A shell surroundings of each copper core comprises the structured portion (e.g., arranged $Pm\bar{3}m$ structure). In aspects of embodiments and/or embodiments of the present invention, a mass fraction of the structured portion (e.g., arranged $Pm\bar{3}m$ structure) might comprise an amount from about 0 to about 1.

Example F (CPC65A) This Example F relates to a process for a preparation of a composite material including (1) a porous carbon matrix and (2) a composition comprising nanoparticles comprising copper and platinum. In this Example F, the three (3) stages are combined so that the process comprises two (2) stages. Specifically in this Example F, the First, Second, and Third Stages are combined.

Combined First, Second, and Third Stages: A mixture of ingredients is prepared by sequentially adding to about 25 mL of water at about 60° C. while stirring:

from about 0.1-1 g of hydroxyl-ethyl cellulose (Merck KGaA, Darmstadt, Germany, cat. No. 8.22068);

from about 0.1-1 g of copper acetate (FLUKA brand and now Sigma-Aldrich Chemie GmbH, Switzerland, cat. No. 61145);

from about 0.1-1 g of tetra-ammonium platinum (II) nitrate (Alfa Aesar, a member of the Johnson Matthey group of companies, Ward Hill, Mass., US; cat. No. 88960); and from about 0.2-1 g of carbon black (VULCAN® XC72R carbon black, Cabot Corporation headquartered in Boston, Mass., US).

The mixture is homogenized while stirring using a magnetic stirrer or manually for from about 5 min to about 20 min and then using an ultrasonic homogenizer (Hielscher Ultrasonics GmbH, Teltow, Germany—Model UP200S ultrasonic processor) for from about 5 min to about 10 min. After homogenization, the mixture is cooled to about room temperature and left for about 12 h resulting in a viscous sol or gel. The resultant viscous sol or gel is frozen using liquid nitrogen and dried under vacuum resulting in a freeze-dried gel.

Then a composite of a porous carbon matrix and nanoparticles including copper and platinum is prepared "in situ" from the freeze-dried gel by placing it into a controlled atmosphere oven having reducing Ar—$H_2$ gas mixture (comprising about 5 vol % H2) flow at a rate of about 50 mL/min. The oven is heated at a rate of from about 2° C./min to about 20° C./min to from about 500° C. to about 900° C. for from about 0.1 h to about 5 h and cooled at a rate about 2° C./min from about 10° C./min to about room temperature resulting in a composite.

Fourth stage: A composite of a porous carbon matrix and nanoparticles including copper and platinum of the Combined First, Second, and Third stages is heat treated to effect alloying of platinum and copper. The resultant composite of the Combined First, Second, and Third stages is heat treated in a controlled atmosphere oven at (a) first preselected temperature in (i) an air atmosphere and, then, (ii) a reducing atmosphere; (b) a second preselected temperature in a reducing atmosphere; and then, (c) a third preselected temperature in a reducing atmosphere.

(a) After placing the resultant composite of the Combined First, Second, and Third stages into a controlled atmosphere oven while maintaining an air atmosphere, the oven is heated at a rate of about 5° C./min to a first preselected temperature (from about 250° C. to about 400° C.) and then held at this preselected temperature for about 1 h. After from about 5 min to about 15 min of the oven reaching the first preselected temperature (from about 250° C. to about 400° C.), the atmosphere in the oven is changed:

(i) first the controlled atmosphere oven is flushed using argon flowing at a rate of about 100 mL/min for about 15 min and, then, (ii) the atmosphere of the oven is change to a reducing Ar—H$_2$ gas mixture (comprising about 5 vol % H2) flowing at a rate of about 100 milliliter per minute (mL/min) through the end of the heat treatment at the first preselected temperature (from about 250° C. to about 400° C.).

(b) After about 1 h at the first preselected temperature (from about 250° C. to about 400° C.), the oven is heated at a rate of from about 2° C./min to about 20° C./min to a second preselected temperature (from about 600° C. to about 900° C.) and held at the a second preselected temperature (from about 600° C. to about 900° C.) for from about 0.1 h to about 10 h.

(c) After completion of the heat treatment at the second preselected temperature (from about 600° C. to about 900° C.), the oven is cooled to third preselected temperature (from about 600° C. to about 400° C.) and held at the third preselected temperature (from about 600° C. to about 400° C.) for from about 0.1 h to about 100 h.

After completion of the heat treatment at third preselected temperature (from about 600° C. to about 400° C.), the oven is cooled to cooled to about room temperature at a rate of from about 0.2° C./min to about 10° C./min followed by a flushing the oven chamber using argon flowing at a rate of about 100 mL/min for about 15 min.

The heat-treated composite of this Example F includes porous carbon matrix and nanoparticles including a platinum-copper alloy. The nanoparticles including a platinum-copper alloy are characterized as comprising a non-structured portion (e.g., unarranged Fm$\bar{3}$m structure) and a structured portion (e.g., arranged Pm$\bar{3}$m structure).

At least a portion of a surface of the nanoparticles including the platinum-copper alloy has the structured portion (e.g., arranged Pm$\bar{3}$m structure). In aspects of embodiments and/or embodiments of the present invention, a mass fraction of the structured portion (e.g., arranged Pm$\bar{3}$m structure) might comprise an amount from about 0 to about 1.

Example G (CPC26BPtL) This Example G relates to a process for a preparation of a composite material of (1) a porous carbon matrix and (2) a composition of nanoparticles including iron and platinum. As described above, the process might include four (4) stages. The process of Example G is substantially that of Example A except that in the First Stage ferric citrate (FLUKA brand and now Sigma-Aldrich Chemie GmbH, Switzerland, cat. No. F6129-250G) is used instead of copper acetate monohydrate in the preparation of the freeze-dried gel. The heat-treated composite of this Example G includes a porous carbon matrix and nanoparticles including a platinum-iron alloy coated iron (e.g., a platinum-iron alloy shell on iron core) and the platinum-iron alloy shell on the iron core is characterized as comprising a non-structured portion (e.g., unarranged Fm$\bar{3}$m structure) and a structured portion (e.g., arranged cubic Pm$\bar{3}$m structure or tetragonal and orthorhombic arrangements {e.g., P4/mmm structure} . . . etc.). A shell surroundings of each iron core comprises the structured portion (e.g., arranged cubic Pm$\bar{3}$m structure or tetragonal and orthorhombic arrangements {e.g. P4/mmm structure} . . . etc.). In aspects of embodiments and/or embodiments of the present invention, a mass fraction of the structured portion (e.g, arranged cubic Pm$\bar{3}$m structure or tetragonal and orthorhombic arrangements {e.g. P4/mmm structure} . . . etc.) might comprise an amount from about 0 to about 1.

Depending on an initial concentration of noble and non-noble transition metals on the active carbon support and their ratio one can obtain catalysts that are less active than those described in the preferred aspects of embodiments or preferred embodiments. Thus, for instance, if the concentration of the noble metal element in the binary alloy is lower or higher than certain value described in aspects of embodiment or embodiment, a catalyst can be characterized by poorer specific and/or mass activity in certain electrochemical reaction, which, however, will be still higher than the characteristics of the hitherto used commercial electrocatalysts. The functions of the various composites shown in Table 1, FIGS. 7-10 would, in aspects of embodiments and/or embodiments, might be implemented by one or more electrode types used in proton exchange membrane (PEM) fuel cells, methanol-based fuel cells, or other fuel cells utilizing metallic electrocatalysts. Similar functions might, by analogy, be implemented in devices utilizing heterogeneous catalysis based on metallic catalysts. Also, in the claims expressed as a means for performing a specified function is intended to encompass any way of performing that function including, for example: (a) a combination of composites which performs that function or (b) in devices that utilize this function in any form.

Accordingly, various modifications, adaptations, and alternatives may occur to one skilled in the art without departing from the spirit and scope of the present invention. It should be understood that all such modifications and improvements have been deleted herein for the sake of conciseness and readability but are properly within the scope of the following claims.

What is claimed is:

1. A process for making a composite comprising an electrically conductive matrix and one or more nanoparticles comprising:
   (α) forming a gel from preselected amounts of:
      (i) one or more M(II) based salts;
      (ii) one or more electrically conductive matrix sources;
      (iii) one or more polyelectrolytes;
      (iv) one or more surfactants;
   (β) pyrolyzing the gel of step (α) in a reducing atmosphere and/or inert atmosphere to form a composite including an electrically conductive matrix and nanoparticles;
   (γ) reducing the composite of step (β) to composite particles;
   (δ) subjecting the composite particles of step (γ) to one or more of metallizations; and
   (ε) hardening or tempering the composite particles of step (δ) in a reducing atmosphere and/or inert atmosphere.

2. A process for making a composition comprising:
   (α) forming a gel from preselected amounts of:
      (i) one or more M(II) based salts;
      (ii) one or more electrically conductive matrix sources;
      (iii) one or more polyelectrolytes;
      (iv) one or more surfactants;
   (β) pyrolyzing the gel of step (α) in a reducing atmosphere and/or inert atmosphere to form a composite including an electrically conductive matrix and one or more nanoparticles;
   (γ) reducing the composite of step (β) to composite particles;
   (δ) subjecting the composite particles of step (γ) to one or more of metallizations; and
   (ε) hardening or tempering the composite particles of step (δ) in a reducing atmosphere and/or inert atmosphere.

* * * * *

UNITED STATES PATENT AND TRADEMARK OFFICE
CERTIFICATE OF CORRECTION

PATENT NO. : 9,147,885 B2
APPLICATION NO. : 13/554551
DATED : September 29, 2015
INVENTOR(S) : Bele et al.

Page 1 of 1

It is certified that error appears in the above-identified patent and that said Letters Patent is hereby corrected as shown below:

In the specification

In Column 1, line 10, --Hačvar-- should be "Hočevar"

In Column 3, line 64, --in situ-- should be ""in situ""

In Column 15, line 61, -->>in situ<<-- should be ""in situ""

In Column 18, line 16, --<<in site>>-- should be ""in situ""

In Column 22, line 51, --form-- should be "from"

In Column 23, line 17, --change-- should be "changed"

In Column 27, line 1, --change-- should be "changed"

In Column 28, line 10, --Table1-- should be "Table A"

Signed and Sealed this
Twenty-ninth Day of March, 2016

Michelle K. Lee
*Director of the United States Patent and Trademark Office*